United States Patent
Tomoda

(10) Patent No.: US 10,429,082 B2
(45) Date of Patent: Oct. 1, 2019

(54) HEATING COOKING DEVICE AND HEATING COOKING METHOD USING SUPERHEATED VAPOR

(71) Applicant: Tomoda Selling & Sailing Co., Ltd., Sakaiminato, Tottori (JP)

(72) Inventor: Hiroshi Tomoda, Tottori (JP)

(73) Assignee: TOMODA SELLING & SAILING CO., LTD., Tottori (JP)

( * ) Notice: Subject to any disclaimer, the term of this patent is extended or adjusted under 35 U.S.C. 154(b) by 412 days.

(21) Appl. No.: 15/204,172

(22) Filed: Jul. 7, 2016

(65) Prior Publication Data

US 2017/0010005 A1    Jan. 12, 2017

(30) Foreign Application Priority Data

Jul. 8, 2015  (JP) .................................. 2015-137114

(51) Int. Cl.
   *F24C 15/32*      (2006.01)
   *F22G 1/16*       (2006.01)
   (Continued)

(52) U.S. Cl.
   CPC .............. *F24C 15/327* (2013.01); *A21B 3/04* (2013.01); *A23L 5/13* (2016.08); *F22G 1/165* (2013.01);
   (Continued)

(58) Field of Classification Search
   CPC ... A21B 3/04; F22B 1/284; A47J 27/04; A47J 27/16; F22G 1/165; F24C 15/327; F24C 15/003
   See application file for complete search history.

(56) References Cited

U.S. PATENT DOCUMENTS 1,532,086 A  *  3/1925  Shroyer .................... A21B 3/04
                                                   219/401
4,426,923 A  *  1/1984  Ohata ..................... A47J 39/003
                                                   126/20
(Continued)

FOREIGN PATENT DOCUMENTS

JP    2001-190410 A    7/2001
JP    2002-083673 A    3/2002
(Continued)

*Primary Examiner* — Jorge A Pereiro
(74) *Attorney, Agent, or Firm* — Harness, Dickey & Pierce, P.L.C.

(57) ABSTRACT

A heating cooking device includes a casing accommodating a heating furnace allowing a heating target to be located therein; a water storage tank; a hot vapor generation device connected with the water storage tank; a superheated vapor generation device heating hot vapor; a fan introducing superheated vapor into the heating furnace; and a superheated vapor discharge portion. The hot vapor generation device includes a first electric heater; and a first housing accommodating the first electric heater. A water level in the first housing matches a water level in the water storage tank. The superheated vapor generation device includes a second electric heater; and a second housing accommodating the second electric heater. At least a part of the second housing is located in an interior of the heating furnace. The hot vapor generation and the superheated vapor generation device are accommodated in the casing.

13 Claims, 12 Drawing Sheets

(51) Int. Cl.
*A21B 3/04* (2006.01)
*A23L 5/10* (2016.01)

(52) U.S. Cl.
CPC ......... *A23V 2002/00* (2013.01); *F24C 15/325* (2013.01)

(56) References Cited

U.S. PATENT DOCUMENTS

| | | | | |
|---|---|---|---|---|
| 4,449,026 A * | 5/1984 | Satoh | ................... | H05B 6/6411 |
| | | | | 219/682 |
| 4,906,485 A * | 3/1990 | Kirchhoff | ................ | A21B 3/04 |
| | | | | 126/20 |
| 5,158,064 A * | 10/1992 | Willis | ..................... | A47J 27/04 |
| | | | | 126/20 |
| 5,802,963 A * | 9/1998 | Cohn | ..................... | A21C 13/00 |
| | | | | 126/21 A |
| 6,157,006 A * | 12/2000 | Sickles | .................... | A21B 3/04 |
| | | | | 126/20 |
| 6,323,464 B1 * | 11/2001 | Cohn | ..................... | A21C 13/00 |
| | | | | 126/21 A |
| 6,906,291 B2 * | 6/2005 | Shozo | ..................... | A21B 3/04 |
| | | | | 126/348 |
| 6,909,071 B2 * | 6/2005 | Shozo | ..................... | A21B 3/04 |
| | | | | 126/348 |
| 6,911,626 B2 * | 6/2005 | Shozo | ..................... | A21B 3/04 |
| | | | | 126/20 |
| 7,049,550 B2 * | 5/2006 | Shozo | ..................... | A21B 3/04 |
| | | | | 126/369 |
| 7,143,761 B2 * | 12/2006 | Hwang | .................... | A21B 3/04 |
| | | | | 126/20 |
| 8,420,983 B2 * | 4/2013 | Ohashi | .................... | A21B 3/04 |
| | | | | 219/401 |
| 2006/0065266 A1 * | 3/2006 | Saksena | .................. | A21B 3/04 |
| | | | | 126/369 |
| 2008/0236404 A1 * | 10/2008 | Ose | .......................... | F24C 7/08 |
| | | | | 99/327 |
| 2010/0230397 A1 * | 9/2010 | Ohashi | .................... | A21B 3/04 |
| | | | | 219/401 |
| 2013/0025200 A1 * | 1/2013 | Uchiyama | ................. | C10J 3/20 |
| | | | | 48/78 |
| 2015/0320257 A1 * | 11/2015 | Carbone | ................. | A47J 37/041 |
| | | | | 99/421 H |

FOREIGN PATENT DOCUMENTS

JP 4427090 B1 3/2010
JP 4620732 B2 1/2011

* cited by examiner

HEATING COOKING DEVICE AND HEATING COOKING METHOD USING SUPERHEATED VAPOR

BACKGROUND OF THE INVENTION

1. Field of the Invention

The present invention relates to a heating cooking device and a heating cooking method using superheated vapor, and especially to a heating cooking device realizing a high temperature uniformity.

The present application claims the benefit of priority based upon Japanese Patent Application No. 2015-137114 filed on Jul. 8, 2015, the entirety of which is incorporated herein by reference.

2. Description of the Related Art

Superheated vapor is vapor obtained by heating water vapor to a temperature exceeding 100° C. at a constant pressure. Unlike water vapor or high-pressure, high-temperature water vapor, the superheated water vapor (or superheated vapor) is heat-radiating gas that radiates far infrared rays preferable for heating food, and has an advantage that, for example, oxygen is blocked and thus oxidation is prevented in an atmosphere thereof. It is considered that use of superheated vapor allows meat, fish or the like to be baked to provide good taste (see, for example, Japanese Laid-Open Patent Publication No. 2001-190410).

A known device that bakes food such as meat, fish or the like by use of superheated vapor is, for example, a device shown in FIG. 8 in Japanese Laid-Open Patent Publication No. 2001-190410. This device includes a boiler (not shown), a superheated vapor generation device "a" that is connected with the boiler with a pipe "d" and has an ejection opening "b", and a conveyor "c" on which food may be placed to be transported. This device is operated as follows. Water vapor is generated from the boiler and is transported to a heating pipe a1 provided in the superheated vapor generation device "a" via the pipe d. The water vapor flowing in the heating pipe a1 is heated by a burner a2 provided in the superheated vapor generation device "a" to generate superheated vapor. The superheated vapor is ejected from the ejection opening "b" and blown onto food placed on the conveyor "c". Thus, the food is baked.

According to a common method of generating superheated vapor, water vapor is combusted by a burner by use of fuel such as gas, petroleum or the like as described above. However, such a system using a burner requires very large scale facilities including smoke discharge facilities, which needs an increased investment for the facilities. Such a system also requires additional facilities against environmental pollution or the like. In addition, the energy efficiency at which superheated vapor is generated is not very high although this is not noticed much because this system is commonly used. There is another system using an electromagnetic induction-type heating unit. The energy efficiency of this system is not very high, either.

An example of system using an electromagnetic induction-type heating unit is described in Japanese Laid-Open Patent Publication No. 2002-83673. In the case of using an electromagnetic induction coil, even a small device requires power of about 90 kW (kilowatts). Considering that a large scale refrigerator for industrial use requires about 75 kW at most, the power required by the system using an electromagnetic induction coil is outrageously large. There is also a superheated vapor cooking device for home use that has substantially the same size as that of a microwave oven. With such a device, water is boiled each time to generate water vapor, and superheated vapor is generated from the water vapor. Since the time to generate water vapor is necessary, the device is not convenient to be used. Each time the device becomes out of the water for generating water vapor, supplement of water is necessary. For these reasons, it is difficult to use this device continuously for industrial use. The amount of superheated vapor assumed to be generated by a device for home use is significantly different from the amount assumed to be generated by a device for industrial use. Therefore, in the case where a device developed for home use is subjected to industrial use, the amount of heat is not sufficient, and heating is not performed sufficiently.

In such a situation, the present inventor developed a heating cooking device using superheated vapor and disclosed the device in Japanese Patent No. 4427090. The heating cooking device disclosed in Japanese Patent No. 4427090 uses superheated vapor to perform heating in a plurality of temperature ranges (multi-purpose heating cooking device). The heating cooking device includes a superheated vapor generation device connected with a hot vapor generation device and a heating pot into which the superheated vapor is introduced. In this heating cooking device, a part of the superheated vapor generation device that heats hot vapor generated by the hot vapor generation device to generate superheated vapor is located inside the heating pot. A first cooking container in communication with the inside of the heating pot is attached to a part of the heating pot.

This heating cooking device includes the superheated vapor generation device that heats hot vapor from the hot vapor generation device to generate superheated vapor, and the heating pot into which the superheated vapor is introduced. The first cooking container in communication with the inside of the heating pot is attached to a part of the heating pot. Therefore, the heating cooking device performs heating in a plurality of temperature ranges by use of superheated vapor continuously generated, with no use of a burner. In the case where cooking is performed with use of superheated vapor generated from boiler vapor, a boiler is needed. However, the heating cooking device described in Japanese Patent No. 4427090 does not need such a boiler. Cooking by use of superheated vapor is realized as long as there is a power supply. Therefore, this heating cooking device is suppressed from being increased in the scale and is compact.

For further improving the heating cooking device described in Japanese Patent No. 4427090, the present inventor paid attention to the following points. The heating cooking device described in Japanese Patent No. 4427090 is configured to heat food in a splendid manner by use of superheated vapor and also to perform heating in a plurality of temperature ranges by use of exhaust heat. A heating cooking device is required to provided convenience that the heating is performed in a plurality of temperature ranges and is also required to have uniformity in the temperature in the heating pot (in the furnace) in a single temperature range. This will be described in more detail. A superheated vapor cooking device having substantially the same size as that of a microwave oven is for home use, and the number of dishes that are put therein is one or two. Therefore, the user does not pay attention to a temperature non-uniformity in the furnace, and the non-uniformity in the heating or taste is not a serious problem because the heating cooking device is for home use. By contrast, in the case where a heating cooking device is used continuously at an industrial level, a great number of food materials are put into one heating pot (heating furnace) and heated at the same time. Therefore, a non-uniformity in the temperature leads to non-uniformity in the heating or taste. When this occurs, the cooked materials may not be provided for the market. In addition, the heating cooking device is used many times each day. For these reasons, a non-uniformity in the heating or taste caused by the non-uniformity in the temperature cannot be ignored.

The heating cooking device described in Japanese Patent No. 4427090 heats the food materials in the heating pot by use of superheated vapor generated by heating hot vapor having a pressure of about 1 atm. Therefore, as compared with a case using superheated vapor derived from boiler vapor having a high pressure, a high temperature and a high flow rate, the temperature uniformity in the furnace of the heating cooking device described in Japanese Patent No. 4427090 is significantly higher. However, a heating cooking device having a temperature uniformity exceeding that of the heating cooking device described in Japanese Patent No. 4427090 may be desired. The present inventor accumulated further studies to complete a heating cooking device having a temperature uniformity exceeding that of the conventional heating cooking device and thus arrived at the present invention.

The present invention made in light of the above-described point has a main object of providing a heating cooking device and a heating cooking method realizing a high temperature uniformity.

SUMMARY OF THE INVENTION

A heating cooking device according to the present invention performs heating by use of superheated vapor. The heating cooking device includes a casing accommodating a heating furnace allowing a heating target to be located therein; a water storage tank accommodated in the casing, the water storage tank storing a liquid; a hot vapor generation device connected with the water storage tank via a communication pipe, the hot vapor generation device heating the liquid supplied from the water storage tank to generate hot vapor; a superheated vapor generation device connected with the hot vapor generation device, the superheated vapor generation device heating the hot vapor generated by the hot vapor generation device to generate superheated vapor; a fan introducing the superheated vapor generated by the superheated vapor generation device into the heating furnace; an introduction pipe having an end connected with the fan and another end connected with a top part of the heating furnace; and a superheated vapor discharge portion connected with the introduction pipe, the superheated vapor discharge portion discharging the superheated vapor into an interior of the heating furnace. The hot vapor generation device includes a first electric heater heating the liquid; and a first housing accommodating the first electric heater and holding the liquid. The first housing and the water storage tank are connected with each other via the communication pipe to match a water level of the liquid in the first housing and a water level of the liquid in the water storage tank with each other. The superheated vapor generation device includes a second electric heater heating the hot vapor; and a second housing accommodating the second electric heater. At least a part of the second electric heater and at least a part of the second housing are located in the interior of the heating furnace. The hot vapor generation device and the superheated vapor generation device are accommodated in the casing.

In a preferable embodiment, the heating cooking device further includes a circulation fan absorbing the superheated vapor located in a bottom region of the interior of the heating furnace and discharging the superheated vapor into a top region of the interior of the heating furnace.

In a preferable embodiment, the superheated vapor generation device is located in the bottom region of the interior of the heating furnace. The superheated vapor discharge portion is located in the top region of the interior of the heating furnace.

In a preferable embodiment, the superheated vapor generation device includes a plurality of the second electric heaters and a plurality of the second housings.

In a preferable embodiment, the heating cooking device further includes a U-shaped heater formed of an electric heating wire, the U-shaped heater being located in the interior of the heating furnace.

In a preferable embodiment, the U-shaped heater is provided in each of the top region and the bottom region of the interior of the heating furnace.

In a preferable embodiment, the heating cooking device further includes a control device connected with the first electric heater and the second electric heater, the control device controlling heating performed by the first electric heater and the second electric heater; and a temperature sensor provided in the interior of the heating furnace. The temperature sensor is connected with the control device.

In a preferable embodiment, the hot vapor generated by the hot vapor generation device is saturated water vapor having a minute pressure having a gauge pressure of 0.1 MPa or less.

A heating cooking method according to the present invention is performed by use of superheated vapor. The heating cooking method includes the steps of introducing a liquid from a water storage tank storing the liquid to a hot vapor generation device via a communication pipe; heating, by a superheated vapor generation device, the hot vapor generated by the hot vapor generation device to generate superheated vapor; introducing the superheated vapor generated by the superheated vapor generation device into an interior of a heating furnace by use of a fan; heating a heating target in the heating furnace by use of the superheated vapor filling the interior of the heating furnace; and absorbing the superheated vapor in a bottom region of the interior of the heating furnace and discharging the superheated vapor into a top region of the interior of the heating furnace to circulate the superheated vapor.

In a preferable embodiment, the superheated vapor generation device includes a second electric heater heating the hot vapor; and a second housing accommodating the second electric heater. At least a part of the second electric heater and at least a part of the second housing are located in the bottom region of the interior of the heating furnace. The superheated vapor located in the bottom region of the interior of the heating furnace is heated by the second housing accommodating the second electric heater.

In a preferable embodiment, a U-shaped heater formed of an electric heating wire is located in the interior of the heating furnace. The heating cooking method further includes the step of putting a grilling mark on a surface of the heating target by the U-shaped heater.

In a preferable embodiment, in the step of heating the heating target, the interior of the heating furnace contains oxygen at a content lower than in the atmosphere.

In a preferable embodiment, the hot vapor generated by the hot vapor generation device is saturated water vapor having a minute pressure having a gauge pressure of 0.1 MPa or less.

In a preferable embodiment, the heating target is at least one selected from the group consisting of a marine product, meat, vegetable, bread and rice.

A heating cooking device according to the present invention performs heating by use of superheated vapor. The heating cooking device includes a casing accommodating a heating furnace allowing a heating target to be located therein; a hot vapor generation device generating hot vapor; a superheated vapor generation device connected with the hot vapor generation device, the superheated vapor generation device heating the hot vapor generated by the hot vapor generation device to generate superheated vapor; a fan introducing the superheated vapor generated by the superheated vapor generation device into the heating furnace; an introduction pipe having an end connected with the fan and another end connected with a top part of the heating furnace; and a superheated vapor discharge portion connected with the introduction pipe, the superheated vapor discharge portion discharging the superheated vapor into an interior of the heating furnace. The hot vapor generation device includes a first electric heater heating a liquid; and a first housing accommodating the first electric heater and holding the liquid. The superheated vapor generation device includes a second electric heater heating the hot vapor; and a second housing accommodating the second electric heater. At least a part of the second electric heater and at least a part of the second housing are located in the interior of the heating furnace. The second housing has a through-hole, through which the superheated vapor is released, the through-hole being formed in a part of the second housing located in the interior of the heating furnace.

In a preferable embodiment, the heating cooking device further includes an absorption opening through which gas in the interior of the heating furnace is absorbed, the absorption opening being located in a bottom region of the interior of the heating furnace. The fan is a circulation fan transferring the gas, absorbed through the absorption opening, to the superheated vapor discharge portion to circulate the gas in the interior of the heating furnace.

In a preferable embodiment, the heating cooking device further includes a water storage tank storing the liquid. The first housing and the water storage tank are connected with each other via a communication pipe to match a water level of the liquid in the first housing and a water level of the liquid in the water storage tank with each other. The superheated vapor generation device is located in a bottom region of the interior of the heating furnace. The superheated vapor discharge portion is located in a top region of the interior of the heating furnace. The heating cooking device further comprises a shelf allowing the heating target to be located thereon, the shelf being located between the superheated vapor generation device and the superheated vapor discharge portion.

In a preferable embodiment, the heating cooking device further includes an electric heating wire putting a grilling mark on a surface of the heating target, the electric heating wire being located above and below the shelf; and at least one additional superheated vapor generation device provided between the hot vapor generation device and the superheated vapor generation device.

In a preferable embodiment, the heating cooking device further includes a door for putting the heating target on the shelf or taking out the heating target from the shelf, the door being provided on a side surface of the casing. The casing includes a transparent window in a part thereof, the transparent window providing a display of the heating target located on the shelf. The heating target is at least one selected from the group consisting of meat, a marine product and vegetable.

A method for producing a heated item according to the present invention uses superheated vapor. The method includes the steps of generating hot vapor having a minute pressure having a gauge pressure of 0.1 MPa or less; heating the hot vapor to generate superheated vapor; introducing the superheated vapor into an interior of a heating furnace; heating a heating target in the heating furnace by use of the superheated vapor filling the interior of the heating furnace; and absorbing the superheated vapor in a bottom region of the interior of the heating furnace and discharging the superheated vapor into a top region of the interior of the heating furnace to circulate the superheated vapor.

In a preferable embodiment, in the step of introducing the superheated vapor into the interior of the heating furnace, the superheated vapor is introduced into the bottom region of the interior of the heating furnace. In the step of heating the heating target, the heating target is heated by use of the superheated vapor from the top region of the interior of the heating furnace and the superheated vapor from the bottom region of the interior of the heating furnace.

According to the present invention, a liquid is introduced from the water storage tank storing the liquid to the hot vapor generation device via the communication pipe, and thus the hot vapor (saturated water vapor having a minute pressure) is generated more stably. Thus, the superheated vapor, the temperature of which is controllable more easily than superheated vapor derived from boiler vapor, is introduced into the heating furnace. Unlike the superheated vapor derived from boiler vapor, the superheated vapor filling the interior of the heating furnace does not contain air acting as a heat insulator, and thus keeps the temperature uniformity in the interior of the heating furnace splendidly. The temperature of the superheated vapor in the bottom region of the interior of the heating furnace is lower than the temperature of the superheated vapor in the top region of the interior of the heating furnace. Since the superheated vapor in the bottom region is discharged into the top region, the temperature uniformity is improved in the interior of the heating furnace. In the case where the second housing of the superheated vapor generation device is located in the bottom region of the interior of the heating furnace, the heat of the second housing heated by the second electric heater heats the superheated vapor in the bottom region. This also improves the temperature uniformity in the interior of the heating furnace. Therefore, the present invention provides a heating cooking device and a heating cooking method realizing a high temperature uniformity.

DETAILED DESCRIPTION OF PREFERRED EMBODIMENTS

In production of food, a heating process is one of the most important processes for producing good food of a good taste. Usually, heating by use of a burner, heating by use of warm water or heating by use of oil is often used. As compared with these types of heating, vapor heating is not used much in actuality for a reason that, for example, the total amount of heat is smaller than the heating by use of a burner, warm water or the like. The present inventor made active studies on the possibility of steam heating instead of heating by use of warm water, and as a result, conceived and developed a heating method using superheated vapor (superheated water vapor).

The present inventor developed a technique of heating minute pressure vapor (hot vapor) to generate superheated vapor and directing the superheated vapor to food to heat the food, and disclosed the technique in Japanese Patent No. 4427090. The technology developed by the present inventor (Japanese Patent No. 4427090) is completed itself and splendid. However, the present inventor has found as a result of further studies that it is preferable to further improve the temperature uniformity in order to produce a plurality of pieces of delicious food at the same time. From this point of view, the present inventor made active studies on, and developed, a technology realizing a higher temperature uniformity in a heating cooking device using superheated vapor. Thus, the present invention is achieved.

Hereinafter, a preferable embodiment of the present invention will be described with reference to the drawings. In the following figures, elements or sites having the same function bear the same reference signs, and overlapping descriptions may be omitted or simplified for the sake of simplicity. In the figures, relative sizes (length, width, thickness, etc.) may not accurately reflect the actual relative sizes.

Elements that are other than elements specifically referred to in this specification and are necessary to carry out the present invention may be grasped as a matter of design choice for a person of ordinary skill in the art based on the conventional technology in the art. The present invention may be carried out based on the contents disclosed by this specification and the attached drawings, and the technological common knowledge in the art. The present invention is not limited to any of the following embodiments.

Figure 1:
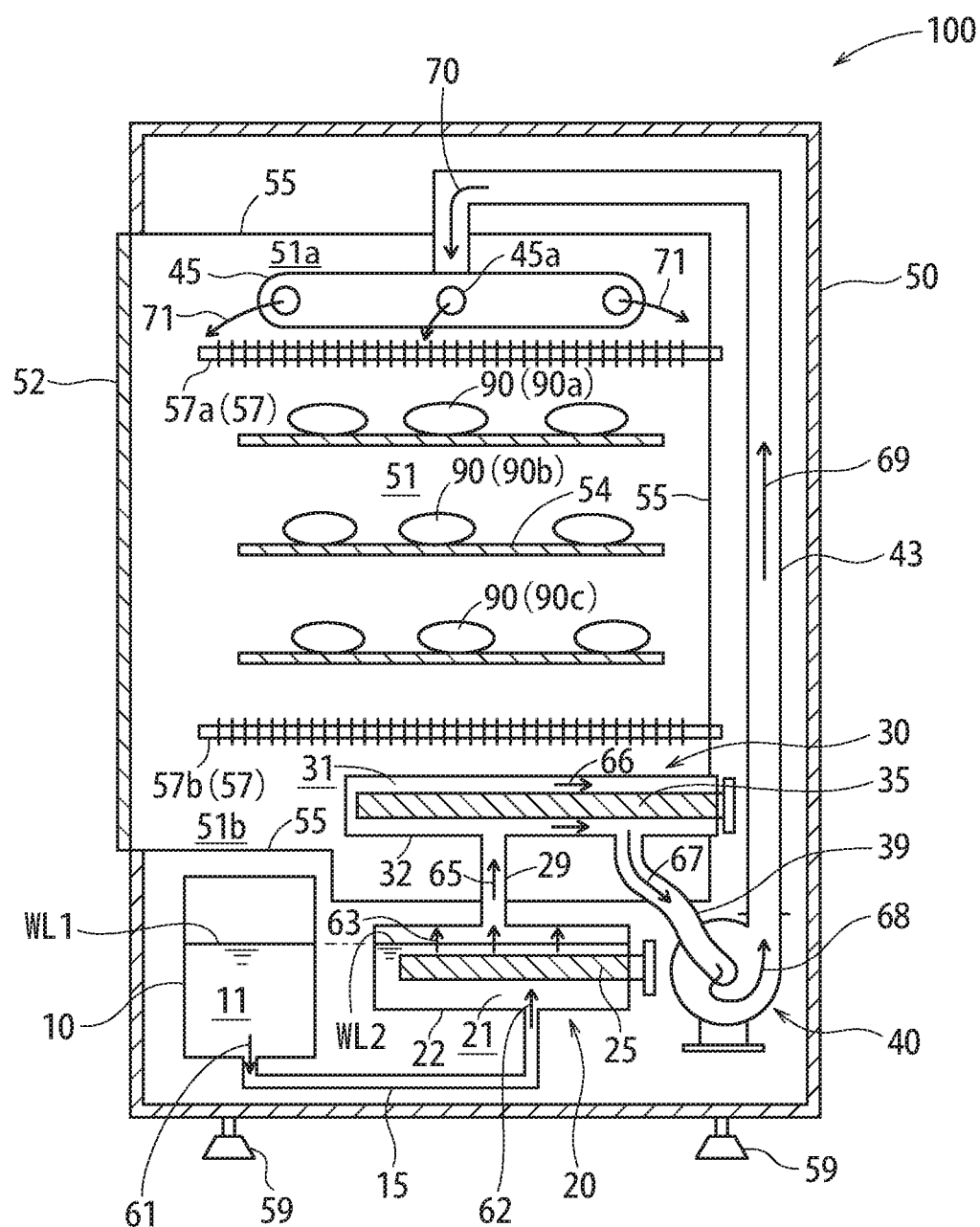
FIG. 1 is a schematic view showing a cross-sectional structure of a heating cooking device 100 in an embodiment according to the present invention.
Figure 2:
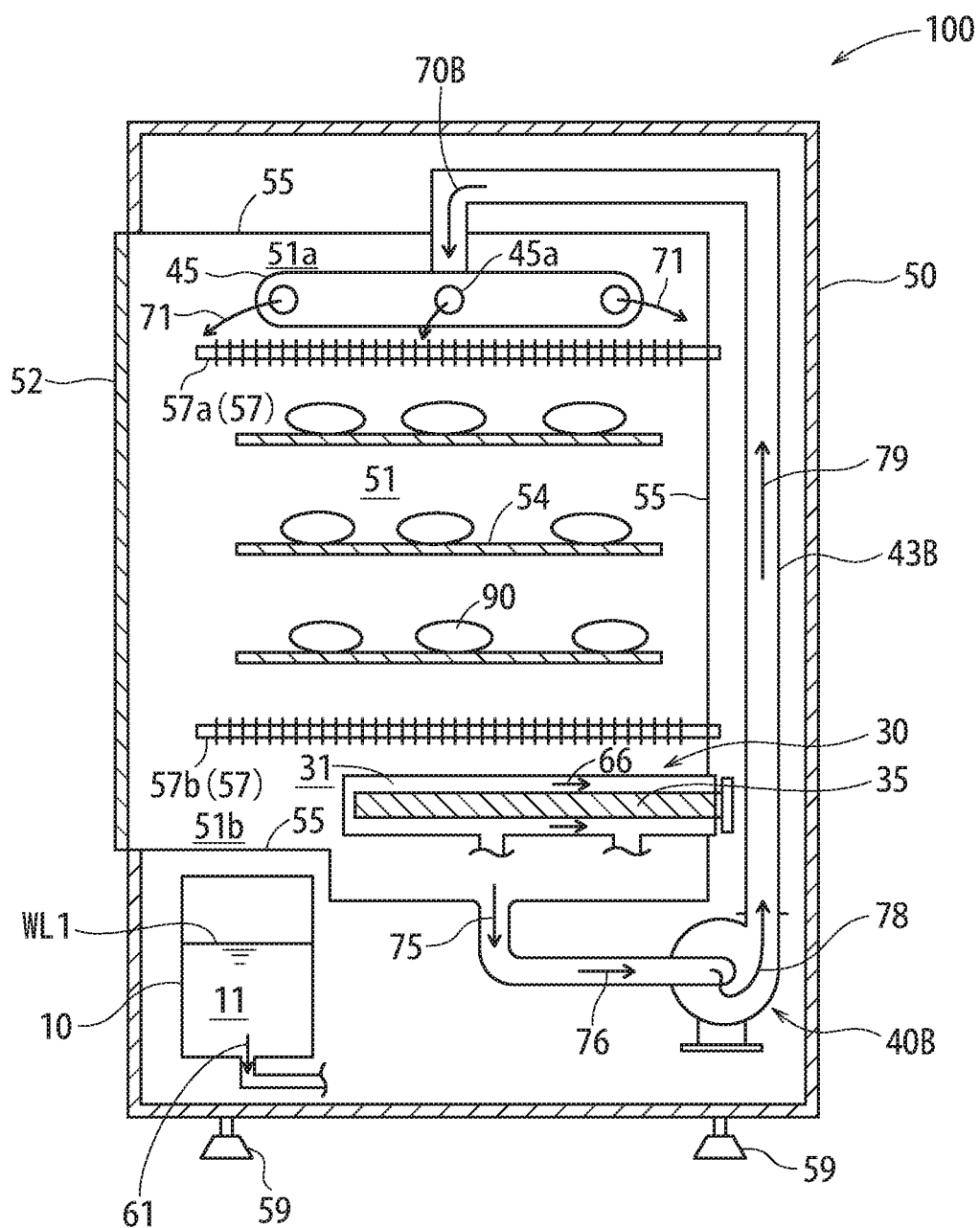
FIG. 2 is a schematic view showing a cross-sectional structure of the heating cooking device 100 in an embodiment according to the present invention.

FIG. 1 and FIG. 2 shows a structure of a heating cooking device 100 in an embodiment according to the present invention. The heating cooking device 100 (heating device) in this embodiment performs heating by use of superheated vapor. As shown in FIG. 1, the heating cooking device 100 in this embodiment includes a housing (outer frame) 50 accommodating a heating furnace 55 on which a heating target (food material to be heated) 90 may be placed, a water storage tank 10, a hot vapor generation device 20, a superheated vapor generation device 30, and a fan (ventilator) 40.

In the casing 50 of the heating cooking device 100, the water storage tank 10 storing a liquid (water) 11 is accommodated. In the casing 50, the hot vapor generation device 20 generating hot vapor 63 is accommodated. The hot vapor generation device 20 is connected with the water storage tank 10 via a communication pipe 15. The hot vapor generation device 20 heats the liquid 11 supplied from the water storage tank 10 via the communication pipe 15 to generate the hot vapor 63. The superheated vapor generation device 30 is connected with the hot vapor generation device 20, and heats the hot vapor generated by the hot vapor generation device 20 to generate superheated vapor 67. In the structure of this embodiment, the water storage tank 10, the hot vapor generation device 20 and the superheated vapor generation device 30 are accommodated in the casing 50. The casing 50 in this embodiment is secured to the ground (e.g., the ground in a plant) by a base part (stopper) 59. Alternatively, the casing 50 may be located on the ground in a movable state.

The superheated vapor generation device 30 is connected with the fan 40 via a pipe 39. The fan 40 is a ventilator introducing the superheated vapor generated by the superheated vapor generation device 30 into the heating furnace 55. The fan 40 is connected with an introduction pipe 43, and the superheated vapor flows in the introduction pipe 43 to be heated. Specifically, one of two ends of the introduction pipe 43 is connected with the fan 40, and the other end of the introduction pipe 43 is connected with a top part of the heating furnace 55. In an interior 51 of the heating furnace 55, a superheated vapor discharge portion 45 discharging superheated vapor 71 is located. The superheated vapor discharge portion 45 is connected with the introduction pipe 43.

In the structure of this embodiment, the hot vapor generation device 20 includes a first electric heater 25 heating the liquid (water) 11 and a first housing 22. The first housing 22 is configured to accommodate the first electric heater 25 and to hold a liquid 21. The first housing 22 and the water storage tank 11 are connected with each other via the communication pipe 15. Thus, a water level WL2 of the liquid 21 in the first housing 22 and a water level WL1 of the liquid 11 in the water storage tank 10 match each other.

The superheated vapor generation device 30 includes a second electric heater 35 heating the hot vapor (66) and a second housing 32 accommodating the second electric heater 35. At least a part of the second electric heater 35 and at least a part of the second housing 32 are located in the interior 51 of the heating furnace 55.

In the structure of this embodiment, the second housing 32 of the superheated vapor generation device 30 is inserted into the heating furnace (or heating pot) 50, and the heat of the second electric heater 35 of the superheated vapor generation device 30 is used to heat the interior 51 of the heating furnace 55 via the second housing 32. Inside the heating furnace 55, a shelf 54 on which the food material (food) 90 may be placed. In this example, a plurality of shelfs 54 (shelves of a multi-stage structure) are set. Food 90a on a top shelf, food 90b on a middle shelf, and food 90c on a bottom shelf are located. The heating furnace 55 is tightly sealable by a door 52. The heating furnace 55 and the door 52 are formed of a metal material (e.g., stainless steel). A part of the door 52 may be formed of a transparent material (e.g., heat-resistant glass). The heating furnace 55 in this embodiment is parallelepiped (or generally parallelepiped), but the heating furnace 55 is not limited to having such a shape. The heating furnace 55 in this embodiment may have any other appropriate three-dimensional shape (for example, may be cylindrical, spherical or the like).

In this embodiment, the superheated vapor generation device 30 is located in a bottom region 51b of the interior 51 of the heating furnace 55. The superheated vapor discharge portion 45 is located in a top region 51a of the interior 51 of the heating furnace 55. In this embodiment, the bottom region 51b refers to a region having a size that is ⅓ or less of the size in a height direction (vertical direction) of the interior 51 of the heating furnace 55 from a bottom surface of the heating furnace 55. In this embodiment, the top region 51a refers to a region having a size that is ⅓ or less of the size in the height direction (vertical direction) of the interior 51 of the heating furnace 55 from a top surface of the heating furnace 55.

In the structure of this embodiment, the hot vapor generation device 20 is located below the bottom surface of the heating furnace 55. The hot vapor generation device 20 is not limited to being located below the bottom surface of the heating furnace 55, and may be located at any position inside the casing 50 of the heating cooking device 100. The hot vapor generation device 20 may be located outside the casing 50 of the heating cooking device 100. However, in order to make the heating cooking device 100 as compact as possible, it is desirable that the hot vapor generation device 20 is located inside the casing 50 of the heating cooking device 100. Similarly, the water storage tank 10 may be located at any position inside the casing 50 of the heating cooking device 100, or outside the casing 50. However, in order to make the heating cooking device 100 as compact as possible, it is desirable that the water storage tank 10 is located inside the casing 50 of the heating cooking device 100.

The first housing 22 of the hot vapor generation device 20 is formed of a heat-resistant material (e.g., metal material). In the structure of this embodiment, the first housing 22 is formed of stainless steel. The first electric heater 25 (e.g., plug heater, flange heater, etc.) is inserted into the first housing 22 of the hot vapor generation device 20. In the structure of this embodiment, the first electric heater 25 is inserted from a rear part of the first housing 22. The first electric heater 25 in this embodiment may be provided with a fin in order to enlarge a heating area size. In the hot vapor generation device 20, the first electric heater 25 heats the liquid 21 to generate the hot vapor from the liquid 21 (see arrow 63). The hot vapor generation device 20 performs heating at an inner pressure that is substantially the same as the atmospheric pressure (e.g., inner pressure of 1.2 atm or less) in operation.

The hot vapor (63) generated by the hot vapor generation device 20 advances to a pipe 29 (see arrow 65) via an opening formed in the first housing 22 and is introduced into the superheated vapor generation device 30. The hot vapor has a minute pressure (e.g., having a gauge pressure of 0.1 MPa or less). Therefore, unlike high-pressure, high-temperature steam vapor, the hot vapor advances slowly in the pipe 29 and reaches the second housing 32 of the superheated vapor generation device 30.

The hot vapor introduced into the superheated vapor generation device 30 is held in the second housing 32, and is heated by the second electric heater 35 to become superheated vapor (superheated water vapor). Assuming that the hot vapor generated by the hot vapor generation device 20 has a temperature of, for example, about 95° C. to 110° C., superheated vapor having a temperature of 150° C. or higher, preferably 180° C. or higher (alternatively, 300° C. to 400° C., or higher) is generated as a result of heating performed by the second electric heater 35 of the superheated vapor generation device 30.

A majority (e.g., ⅔ or more) of the volume of the second electric heater 35 of the superheated vapor generation device 30 is located in the interior 51 of the heating furnace 55. The heat from the second electric heater 35 generates superheated vapor from the hot vapor and also acts as a heat source heating the interior 51 of the heating furnace 55. The second housing 32 in this embodiment is formed of a metal material (e.g., stainless steel), and the second electric heater 35 is inserted from a rear part of the second housing 32. The second electric heater 35 is an electric heater (e.g., plug heater, flange heater, etc.) of, for example, about several kilowatts.

It is preferable that the second electric heater 35 is provided with a fin in order to enlarge a heating area size. In this embodiment, the second electric heater 35 is provided with a plurality of fins. Alternatively, the second electric heater 35 may not be provided with any fin. In the case where the second electric heater 35 is provided with fins, the fins have a function of enlarging the heating area size and also have a function of causing a convection of the hot vapor and the superheated vapor present in the second housing 32 to improve the heating efficiency of the second electric heater 35. Namely, in the case where there is no fin, the hot vapor having a minute pressure and the superheated vapor generated from the hot vapor move slowly in the second housing 32. By contrast, in the case where the second housing 32 is provided with fins to provide a barrier against the flow of the hot vapor and the superheated vapor, a convection occurs in the second housing 32 by the action of the fins. Even in the case where there is no convection, the hot vapor and the superheated vapor located around the second electric heater 35 are heated directly by heat transfer. In addition to this, the convection is caused by the fins. Therefore, the hot vapor and the superheated vapor that are heated at a low degree are allowed to contact the second electric heater and the fins easily. This improves the efficiency of heating for generating the superheated vapor.

The superheated vapor (66) generated by the superheated vapor generation device 30 flows in the pipe 39 via an opening formed in the second housing 32 and is absorbed to the fan 40 (see arrow 67), and is transferred to the introduction pipe 43 by the fan 40 (see arrow 69). The fan 40 is, for example, a sirocco fan. There is no specific limitation on the type of ventilator of the fan 40 as long as the superheated vapor is transferred to the interior 51 of the heating furnace 55 via the introduction pipe 43. An appropriate ventilator may be selected in accordance with the specific characteristics, cost, size and the like.

One of two ends of the introduction pipe 43 is connected with the fan 40, and the other end of the introduction pipe 43 is connected with the top part of the heating furnace 55. In the interior 51 of the heating furnace 55, the superheated vapor discharge portion 45 is located. The superheated vapor transferred by the fan 40 (see arrow 68) flows in the introduction pipe 43 (see arrow 69), and then is transferred to the superheated vapor discharge portion 45 (see arrow 70). Then, the superheated vapor is discharged (released) from the superheated vapor discharge portion 45 into the interior 51 of the heating furnace 55 (see arrows 71).

In the structure of this embodiment, the superheated vapor discharge portion 45 is located in the top region 51a of the interior 51 of the heating furnace 55. The superheated vapor discharge portion 45 includes releasing openings 45a, through which the superheated vapor is released. The releasing openings 45a may be located on a bottom surface of the superheated vapor discharge portion 45 or on a side surface of the superheated vapor discharge portion 45. In order to allow the superheated vapor to be jetted out (sprayed) uniformly from the superheated vapor discharge portion 45, it is preferable that the releasing openings 45a are formed at symmetrical positions in the superheated vapor discharge portion 45. It is preferable that the superheated vapor discharge portion 45 has a symmetrical shape as seen from above the heating furnace 55. In this embodiment, the superheated vapor discharge portion 45 has a shape of "⊞" as seen from above (pipes are connected such that the superheated vapor discharge portion 45 has such a shape). Alternatively, the superheated vapor discharge portion 45 may have any other appropriate symmetrical shape, for example, may be circular, square or the like.

In the interior 51 of the heating furnace 55, into which the superheated vapor generated by the superheated vapor generation device 30 is introduced, the food (food material) 90 as a heating target may be located. Specifically, the door 52 of the heating furnace 55 is opened to put the food 90 in the interior 51 of the heating furnace 55 and then is closed to put the heating furnace 55 into a tightly sealed state. Even though the heating furnace 55 in this embodiment is tightly sealed, the interior 51 of the heating furnace 55 substantially has the atmospheric pressure. Therefore, after the food is heated with the superheated vapor, the heated food may be removed, and the next food may be introduced, with the heating cooking device 100 being kept operating. Thus, as compared with the case where the pressure of the heating furnace 55 is returned to the atmospheric pressure before the food is put into, and removed from, the heating furnace 55, the heating cooking device 100 in this embodiment provides a significantly higher work efficiency.

In the heating cooking device 100 in this embodiment, the shelves 54 on which the heating target (food) 90 may be placed are installed. In this example, the shelves 54 are set in a horizontal direction and are of a multi-stage structure (e.g., three-stage structure). Specifically, the food 90a is laced on the top-stage shelf 54, the food 90b is placed on the middle-stage shelf 54, and the food 90c is placed on the bottom-stage shelf 54. The shelves 54 are formed of, for example, a metal plate-like material, a metal net-like material, a metal rod-like material or the like. The heating target (food) 90 may be located on the shelves 54 as being put on a tray (heat-resistant or metal container).

In the structure of this embodiment, electric heaters 57 formed of an electric heating wire are located in the interior 51 of the heating furnace 55. The electric heaters 57 are U-shaped heaters 57 each formed of, for example, a nichrome wire or the like. The electric heaters 57 heat the food 90 with radiant heat, and especially provide the food 90 with a brown color. In this example, the plurality of electric heaters (U-shaped heaters) 57 (a plurality of stages 57a and 57b) are provided in the vertical direction. In this embodiment, the electric heaters (U-shaped heaters) 57 are not movable in the vertical direction and are secured. Alternatively, the electric heaters (U-shaped heaters) 57 may be movable in the vertical direction. In the case where the electric heaters (U-shaped heaters) 57 are secured, the shelves 54 are movable in an up-down direction (vertical direction) (Even in the case where the electric heaters 57 are movable, the shelves 54 may be movable.) With such an arrangement, the electric heaters 57 may be moved closer to the food 90, or moved farther away from the food 90. The electric heaters 57 formed of an electric heating wire may be made detachable. The electric heaters 57 may be optional, and the heating cooking device 100 may be operated without the electric heaters 57.

The superheated vapor discharged into the interior 51 of the heating furnace 55 is gas. Therefore, the superheated vapor expands to the entirety of the interior 51 of the heating furnace 55 to heat (raise the temperature of) the interior 51 of the heating furnace 55. On a first stage, on which the superheated vapor is introduced into the interior 51 of the heating furnace 55, it is preferable to discharge air from the interior 51 of the heating furnace 55 so that the interior 51 of the heating furnace 55 is filled with as much superheated vapor as possible. A discharge valve (air discharge valve) discharging the air from the interior 51 of the heating furnace 55 may be provided.

In the structure of this embodiment, the hot vapor (65) introduced into the superheated vapor generation device 30 is saturated vapor (saturated water vapor). Therefore, the superheated vapor generated by the superheated vapor generation device 30 has a high temperature but contains a large amount of moisture. Therefore, in the case where the food 90 is heated with the superheated vapor generated by heating the hot vapor (saturated vapor), the food is suppressed from being deprived of moisture more than necessary and dried. On this point, the superheated vapor having a high temperature as a result of heating performed on hot vapor is different from superheated vapor having a high temperature as a result of heating performed on high-temperature, high-pressure steam vapor (superheated vapor from steam vapor).

The superheated vapor has the following advantage. Heat transfer of the superheated vapor, which is performed by a combination of convective heat transfer and radiant heat transfer, has a feature of having a very high thermal efficiency. Fish and meat are baked at a level substantially the same as, or higher than, by direct firing or gas. The superheated vapor is gas derived from water vapor, and therefore, is transferred fast by convection. The superheated vapor is transferred by convection about ten times as fast as air. The superheated vapor has an original property of water vapor of being condensed when contacting a low temperature substance and providing heat to the substance to raise the temperature (core temperature) of the substance, and also has a property of heating a substance like heated air. Therefore, the superheated vapor bakes food within a short time.

Since the superheated vapor raises the core temperature of a product within a short time, two processes of defrosting and baking frozen food such as frozen fish, meat, bread or the like may be performed at once within a short time. It is known that at a certain temperature or higher, drying is performed more quickly in water vapor than in dry air. Therefore, steaming and drying may be performed at the same time. The superheated vapor may also finish food in a porous state. Therefore, heating with the superheated vapor is preferably usable for instant noodle or tea.

The superheated vapor is oxygen-free (or contains oxygen at a concentration lower than that of the atmosphere). Therefore, the superheated vapor suppresses oxidation of oil or destruction of vitamins, and thus improves a preservation state of products. The superheated vapor is also useful to prevent discoloring of food. Water has a property of containing oil when being vaporized. This property is usable as a de-oiling effect.

It is preferable that the temperature of the superheated vapor to be introduced into the interior 51 of the heating furnace 55 is 180° C. or higher. A reason for this is that the superheated vapor, which is generated by heating the hot vapor (saturated vapor), has the properties thereof changed at around 180° C. and becomes suitable to heat a food material or the like. This will be described in more detail. The superheated vapor, which is generated by heating the saturated vapor, has features of being very lightweight, easily filling an enclosed space from a corner to a corner, having a high coefficient of volume expansion, having a low content of oxygen, and having a high heat transfer rate. In the case where such superheated vapor is used to heat a food material, a surface layer of the food material is burned, and the superheated vapor is immersed into an outer layer to raise the inner temperature of the food material so that only the moisture in the surface layer is vaporized in a large amount. As a result, the food material is baked with the surface layer being colored brown and the inside being juicy. The superheated vapor has a property of having the temperature changed rapidly even when the amount of heat is changed slightly. Therefore, it is more preferable for heating of food to generate and introduce superheated vapor having a temperature of 180° C. or higher into the interior 51 of the heating furnace 55 than to use relatively stable superheated vapor having a temperature of about 120° C.

In the heating cooking device 100 in this embodiment, the first electric heater 25 of the hot vapor generation device 20 and the second electric heater 35 of the superheated vapor generation device 30 are used as heating devices (temperature raising devices), and no burner (gas burner) is used. Therefore, the heating cooking device 100 is operable as long as there is a power supply (e.g., 200 V power supply), and thus is very convenient. The heating cooking device 100 does not use fire and thus is safe. The heating cooking device 100 performs an atmospheric pressure operation, and thus is advantageous from the point of view of safety. The heating cooking device 100 uses the first electric heater 25 and the second electric heater 35 as the heating devices (temperature raising devices), and thus may be compact. Namely, installation of a large burner having large heating power is not needed to generate superheated vapor, and installation of a boiler for boiler vapor commonly used for steam heating is not needed. The heating cooking device 100 may be compact and therefore is installed in a food processing plant or at a corner of a restaurant, a kitchen of a hotel, a convenience store or the like.

In the structure shown in FIG. 1, the first electric heater 25 of the hot vapor generation device 20 and the second electric heater 35 of the superheated vapor generation device 30 are connected with a control device (not shown) controlling the heating performed by these heaters. A temperature sensor (not shown) is located in the interior 51 of the heating furnace 55 and is connected with the control device. The water storage tank 10 may be provided with a temperature sensor. The control device controls the first electric heater 25 and the second electric heater 35 based on the numerical value of the temperature sensor and a heating program and thus operates the heating cooking device 100.

The heating target 90 to be located in the heating furnace 55 in this embodiment is typically food, for example, a marine product (fish, Crustacea, Mollusca, shellfish, seaweed, etc.), meat (beef, pork, chicken, etc.), vegetable, fruit or the like. The heating target may be bread, sweet potato, baked potato (including baked potato paste), or pastry (baked pastry, etc.). The heating cooking device 100 may cook rice with the superheated vapor. Studies and experiments performed by the present inventor have demonstrated that in the case where the rice is heated while containing a large amount of moisture by use of superheated vapor without the common rice cooking method (e.g., the rice cooking method of first using a low flame and then using a high flame without the lid being removed) being strictly followed, the rice is cooked delicious within a short time. This will be described in more detail. When superheated vapor of about 120° C. to 140° C. is used, the rice and water reach the boiling point quickly (because an oxygen-free state is provided and a high temperature state is provided around the rice and water) and thus the rice is cooked while containing a large amount of moisture. Strong convection of water allows the rice to be cooked with the grains of rice standing. With common rice cooking, the rice is heated by an electric heater provided only on a bottom surface of the pot (or also on a side surface of the pot). Therefore, the heat transfer is slow. In order to increase the heat transfer rate, a high temperature needs to be used. In this case, the rice is burned.

With the heating with superheated vapor, the fish, for example, is baked without being dried and thus is juicy, tasty and sterilized. Meat is finished soft, tasty and not oily. In the case of fried chicken or tempura, the oil content is made low by merely adding powdered oil or a tiny amount of oil to the batter. In the case of bread, the surface is thin and crispy and the inside is glutinous. Vegetable and fruits may be cooked delicious by use of the properties of the superheated vapor. The heating with the superheated vapor may also be used to roast coffee or tea.

In the structure shown in FIG. 1, the bottom region 51b of the heating furnace 55 tends to have a lower temperature than the top region 51a because of the specific gravity and the convection of the heating gas (superheated vapor). In the structure of this embodiment, the superheated vapor generation device 30 including the second electric heater 35 (second housing 32 accommodating the second electric heater 35) is inserted into the bottom region 51b of the heating furnace 55. Therefore, the tendency that the temperature is decreased in the bottom region 51b of the heating furnace 55 is suppressed. Also in the case where the electric heaters (U-shaped heaters) 57 are located in the bottom region 51b of the heating furnace 55, the tendency that the temperature is decreased in the bottom region 51b of the heating furnace 55 is suppressed. In addition to these arrangements, as shown in FIG. 2, the gas (superheated vapor) in the bottom region 51b of the heating furnace 55 may be introduced into the top region 51a again.

In the structure shown in FIG. 2, the heating cooking device 100 includes a circulation fan 40B absorbing the superheated vapor located in the bottom region 51b of the interior 51b of the heating furnace 55 and discharging the superheated vapor into the top region 51a of the interior 51b of the heating furnace 55. The circulation fan 40B may be of the same type as the fan 40 shown in FIG. 1, or of a different type from the fan 40 shown in FIG. 1 (e.g., ventilator of a different structure, ventilator having a relatively low ventilation capability).

In the structure of this embodiment, as shown in FIG. 2, a pipe is attached to a part of the bottom surface of the heating furnace 55 (bottom surface of the bottom region 51b) and connected with the circulation fan 40B. The superheated vapor located in the bottom region 51b of the heating furnace 55 is absorbed into the circulation fan 40B as shown by arrows 75 and 76. Next, the superheated vapor flows in an introduction pipe 43B connected with the circulation fan 40B (see arrow 79) and is introduced into the superheated vapor discharge portion 45 (see arrow 70B).

In the structure of this embodiment, the superheated vapor from the introduction pipe 43B and the superheated vapor from the introduction pipe 43 shown in FIG. 1 are mixed in the superheated vapor discharge portion 45 and jetted out to the heating furnace 55 (see arrows 71). The introduction pipe 43B and the introduction pipe 43 shown in FIG. 1 may be coupled with each other to mix the superheated vapor in the resultant introduction pipe. Alternatively, the fan 40 shown in FIG. 1 may also act as the circulation fan 40B to mix the superheated vapor generated by the superheated vapor generation device 30 and the superheated vapor located in the bottom region 51b and to introduce the mixed superheated vapor into the top region 51a of the heating furnace 55.

Figure 3:
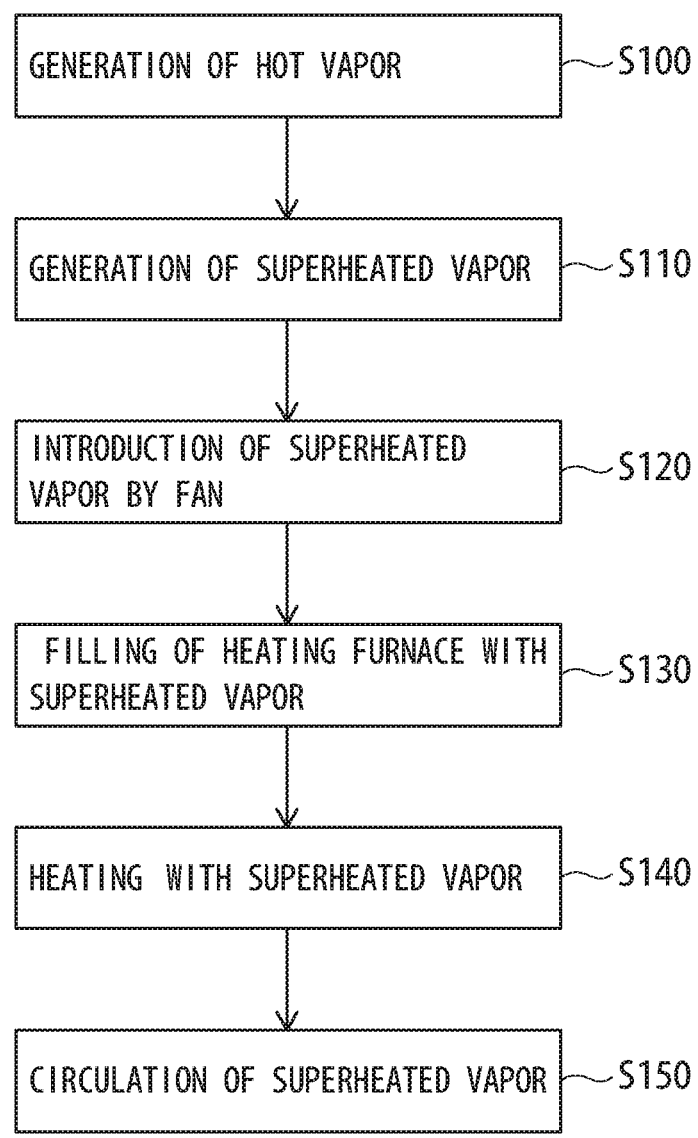
FIG. 3 is a flowchart showing a heating cooking method in an embodiment according to the present invention.

Now, an operation of the heating cooking device 100 in this embodiment and the heating cooking method in this embodiment (heating processing method) will be described. FIG. 3 is a flowchart showing the heating cooking method in this embodiment.

First, water in the water storage tank 10 is introduced into the hot vapor generation device 20, and hot vapor is generated by the hot vapor generation device 20 (S100). In this embodiment, the water storage tank 10 stores water (e.g., tap water) as the liquid 11. The liquid 11 in the water storage tank 10 is introduced into the first housing 22 of the hot vapor generation device 20 via the communication pipe 15 (see arrows 61 and 62). The liquid 21 (same as the liquid 11) introduced into the first housing 22 is heated by the first electric heater 25 accommodated in the first housing 22 to become hot vapor (see arrow 63).

In this embodiment, the "hot vapor" refers to minute pressure vapor. In other words, the "hot vapor" in this embodiment is vapor of a minute pressure (e.g., vapor having a gauge pressure 0.1 MPa or less), unlike high-temperature, high-pressure steam vapor. Herein, the "hot vapor" refers to vapor of a minute pressure and may be any vapor rising from hot water (water vapor). The "hot vapor" is not limited to being in a state of tiny water drops that look like white smoke. Namely, the "hot vapor" may be in a state of white smoke or in a transparent state.

In order to generate the hot vapor (minute pressure vapor) stably by the hot vapor generation device 20, it is preferable that the water level (liquid level) WL2 in the hot vapor generation device 20 is kept constant because the generation of the hot vapor is easily controllable in this state. In this embodiment, since the water storage tank 10 and the first housing 22 are connected with each other via the communication pipe 15, the water level WL1 in the water storage tank 10 and the water level WL2 in the first housing 22 match each other. Therefore, with the structure of this embodiment, the water level (liquid level) WL2 is easily controllable by use of the atmospheric pressure (or by use of the Pascal's principle) with no installation of a complicated and costly water level control mechanism.

Next, the hot vapor generated by the hot vapor generation device 20 is heated to generate superheated vapor (S110). In this embodiment, the hot vapor generated by the hot vapor generation device 20 is introduced into the superheated vapor generation device 30 (see arrow 65), and superheated vapor of a minute pressure (substantially the atmospheric pressure) derived from saturated water vapor is generated by the superheated vapor generation device 30 (see arrow 66).

The superheated vapor to be introduced into the interior 51 of the heating furnace 55 in this embodiment has a temperature of, for example, 300° C. to 400° C. (in a typical example, 400° C.±10° C.). Superheated vapor having such a temperature is generated by heating performed by the superheated vapor generation device 30. In the case where the interior 51 of the heating furnace 55 has a temperature of 400° C., for example, frozen fish (frozen mackerel, etc.) that has not been defrosted is defrosted and also baked within a few minutes. Usually, in the case where frozen fish that has not been defrosted is heated by a heating cooking device, mere defrosting requires quite long a time (several tens of minutes or longer), and the defrosted fish is baked after extract is dripped from the defrosted fish. This is significantly different from the heating performed by the heating cooking device 100 in this embodiment.

The superheated vapor generation device 30 in this embodiment is capable of generating superheated vapor of, for example, 300° C. to 400° C. or higher, but is operated at an inner pressure of substantially 1 atm. Specifically, the superheated vapor generation device 30 is operated at an inner pressure of 1.2 atm or less. Needless to say, in order to perform the heating at 300° C. to 400° C. or higher by use of a boiler, an operating pressure of several atm. or higher is necessary.

The superheated vapor generation device 30 is operable at a pressure of substantially 1 atm. because the superheated vapor generation device 30 is capable of heating hot vapor, which is minute pressure vapor, to generate high-temperature superheated vapor. According to the technological common knowledge, a high pressure is necessary in order to generate high-temperature gas. However, it is actually difficult to properly heat, for example, high-temperature, high-pressure boiler vapor because the rate of the boiler vapor is high, or even if the high-temperature, high-pressure boiler vapor is properly heated, a huge amount of energy is necessary, which is not efficient.

By contrast, with the structure of this embodiment, the hot vapor, which is minute pressure vapor, drifts in the second housing 32 slowly. While drifting, the hot vapor may be heated by the second electric heater 35 to generate superheated vapor of a high temperature (e.g., 300° C. or higher) at the atmospheric pressure. Since the hot vapor, which is minute pressure vapor, drifts in the second housing 32 slowly, the temperature of the second electric heater 35 may be controlled precisely. In the case where the second electric heater 35 is provided with a fin (e.g., in the case where a cylindrical electric heater is provided with a generally annular fin having an opening corresponding to the cylindrical shape), the heating efficiency is improved as described above.

With the structure of this embodiment, the second electric heater 35 is provided in the heating furnace 55, not outside the heating furnace 55. Such a location contributes to improving the heating efficiency of the heating cooking device 100 (or the heating furnace 55). Namely, since the second electric heater 35 has a high temperature in operation, the heating furnace 55 is heated by the heat. In the case where the second electric heater 35 is located in the bottom region 51b, the second electric heater 35 heats the atmosphere (superheated vapor) in the bottom region 51b, which tends to have a lower temperature than in the top region 51a, to contribute to suppression of temperature non-uniformity in the up-down direction (vertical direction). When the operation of the heating cooking device 100 is stopped, the heat generation by the second electric heater 35 does not stop immediately. Since the second electric heater 35 is located in the heating furnace 55, the food may be heated also with the remaining heat of the second electric heater 35 (and the superheated vapor remaining in the heating furnace 55), which improves the energy efficiency.

Next, the superheated vapor generated by the superheated vapor generation device 30 is introduced into the interior 51 of the heating furnace 55 by use of the fan 40 (S120). Specifically, the superheated vapor in the superheated vapor generation device 30 is absorbed into the fan 40 as represented by arrow 67. Next, the superheated vapor is transferred by the fan 40 to the superheated vapor discharge portion 45 via the introduction pipe 43 (arrows 68, 69 and 71). Then, the superheated vapor is released from the superheated vapor discharge portion 45 into the interior 51 of the heating furnace 55 (arrows 71). The superheated vapor (71) released from the superheated vapor discharge portion 45 has a high temperature but has a low flow rate and a pressure that is substantially the atmospheric pressure. Therefore, as compared with high-temperature, high-pressure boiler vapor, the superheated vapor is much easier to be handled. At the time of introduction of the superheated vapor (71), the door 52 of the heating furnace 55 is openable or closable.

Next, the interior 51 of the heating furnace 55 is filled with the superheated vapor (71) introduced thereto (S130). Air acts as a heat insulator and causes the non-uniformity in the temperature. Therefore, it is preferable that the interior 51 of the heating furnace 55 is filled with as much superheated vapor as possible. In the case where the interior 51 of the heating furnace 55 is put into a substantially oxygen-free state with no air, an oxidation preventing function is provided for the heating.

The heating target (food) 90 in the heating furnace 55 is heated with the superheated vapor (71) filling the interior 51 of the heating furnace 55 (S140). The interior 51 of the heating furnace 55 has a pressure of substantially 1 atm., and therefore, the heating target 90 may be set in the interior 51 of the heating furnace 55 before or after the introduction of the superheated vapor. The heating (steam heating with the superheated vapor) of the heating target 90 is performed until a desired baking state is obtained while the time is measured by a clock such as a stopwatch or the like. In the case where it is wished to provide a brown color/grilling mark to the heating target (food) 90, it is desirable to also use the electric heaters 57 formed of an electric heating wire. Even while the heating target 90 is being heated, the temperature non-uniformity caused by the difference in the heating temperature or the site is measured by the temperature sensor located in the interior 51 of the heating furnace 55, so that an ideal heating state is maintained.

As shown in FIG. 2, the superheated vapor may be circulated by the circulation fan 40B (S150). Specifically, the circulation fan 40B is used to absorb the superheated vapor in the bottom region 51b of the heating furnace 55 (see arrows 75 and 76) and then to discharge the superheated vapor into the top region 51b of the heating furnace 55. Thus, the superheated vapor is circulated (see arrows 78, 79, 70B and 71). Circulation of the superheated vapor creates a flow of the superheated vapor in the interior 51 of the heating furnace 55, and thus the heating efficiency for the heating target (food) 90 is improved. Namely, in the case where there is substantially no flow of the superheated vapor, the superheated vapor contacts the heating target 90 and provides the heating target 90 with heat. As a result, the temperature of the superheated vapor is decreased. Such superheated vapor having a low temperature stays around the heating target 90 for a long time. In the case where there is a flow of the superheated vapor, the superheated vapor providing heat moves, and a new part of the high-temperature superheated vapor contacts the heating target 90. In this manner, the heating target 90 is heated smoothly. The superheated vapor having a low temperature moves to the bottom region 51b of the heating furnace 55 because of the large specific gravity thereof. Such superheated vapor may be moved by the circulation fan 40B and mixed with the new part of the superheated vapor to be introduced into the top region 51a again. In this manner, the heating efficiency is improved.

Even in the case where the superheated vapor is not circulated, when the superheated vapor contacts the heating target 90 and provides the heating target 90 with heat and thus is changed to water, the volume of the superheated vapor is decreased to about $1/1000$. A new part of the superheated vapor enters the decreased region, and the next heating target is heated. Therefore, even in the case where the superheated vapor is not circulated, heating is properly performed. However, the heating efficiency is higher in the case where the superheated vapor is circulated.

With the technique of this embodiment, the liquid 21 is introduced from the water storage tank 10 storing the liquid 21 to the hot vapor generation device 20 via the communication pipe 15. Thus, the hot vapor (saturated water vapor of a minute pressure) 63 is generated more stably. Therefore, the superheated vapor (71), the temperature of which is controllable more easily than superheated vapor derived from boiler vapor, is introduced into the heating furnace 55. The superheated vapor filling the interior 51 of the heating furnace 55 does not contain air acting as a heat insulator, unlike the superheated vapor derived from boiler vapor, and thus well keeps the temperature uniformity of the interior 51 of the heating furnace 55.

The superheated vapor in the bottom region 51b of the interior 51 of the heating furnace 55 has a lower temperature than the superheated vapor in the top region 51a. The superheated vapor in the bottom region 51b is discharged into the top region 51a, and thus the temperature uniformity in the interior 51 of the heating furnace 55 is improved. In the case where the second housing 32 of the superheated vapor generation device 30 is located in the bottom region 51b of the interior 51 of the heating furnace 55, the superheated vapor in the bottom region 51b may be heated with the heat of the second electric housing 32 heated by the second electric heater 32. This also improves the temperature uniformity in the interior 51 of the heating furnace 55.

Therefore, with the technique of an embodiment according to the present invention, a heating cooking device and a heating cooking method realizing a high temperature uniformity are provided. The superheated vapor is circulated by the circulation fan 40B to create a flow of the superheated vapor in the interior 51 of the heating furnace 55. This improves the heating efficiency for the heating target 90. In addition, the circulation of the superheated vapor further improves the temperature uniformity of the interior 51 of the heating furnace 55.

Figure 4:
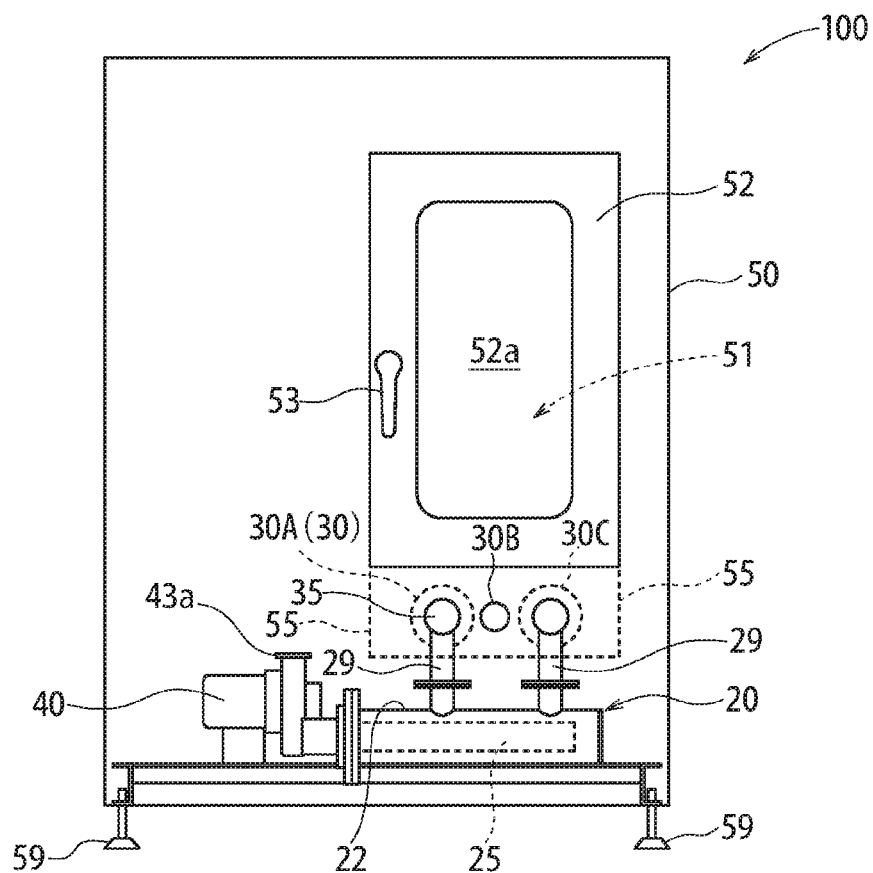
FIG. 4 shows an example of structure of the heating cooking device 100 in an embodiment according to the present invention.
Figure 5:
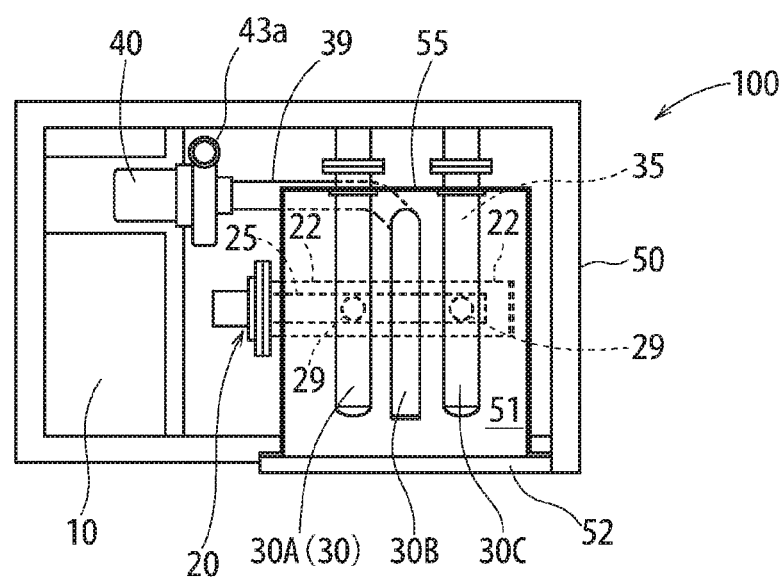
FIG. 5 is a cross-sectional view showing an example of structure of the heating cooking device 100 in an embodiment according to the present invention.
Figure 6:
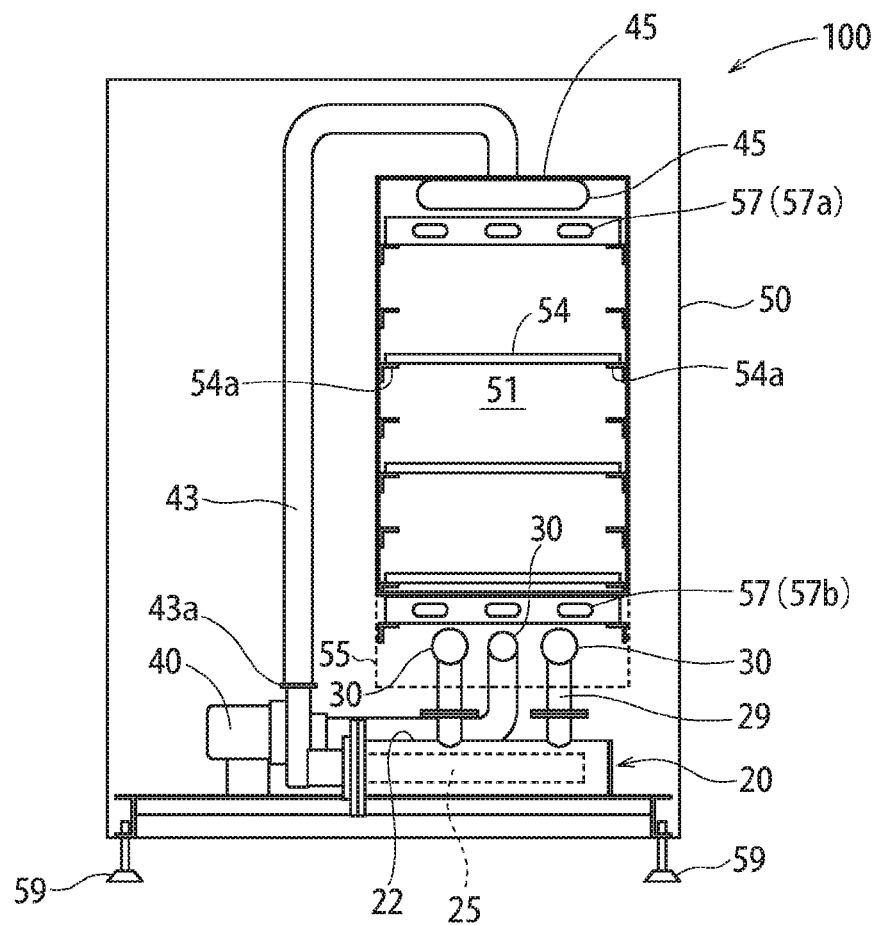
FIG. 6 shows an example of structure of the heating cooking device 100 in an embodiment according to the present invention.
Figure 7:
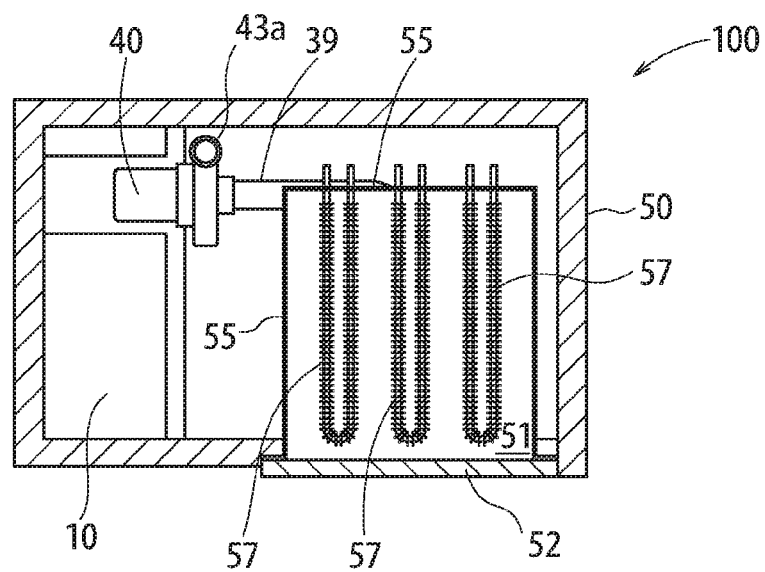
FIG. 7 shows an example of structure of the heating cooking device 100 in an embodiment according to the present invention.

Now, with reference to FIG. 4 through FIG. 7, an example of heating cooking device 100 in this embodiment will be described. The following structure of the heating cooking device 100 shown here is an example, and any other appropriate structure may be adopted. FIG. 4 is a front see-through view of the heating cooking device 100, and FIG. 5 is a horizontal cross-sectional view of the superheated vapor generation device 30 and the vicinity thereof in the heating cooking device 100. FIG. 6 is a vertical cross-sectional view of the heating cooking device 100, showing the interior 51 of the heating furnace 55. FIG. 7 is a horizontal cross-sectional view of the heating cooking device 100, showing interior 51 of the heating furnace 55.

The heating cooking device 100 shown here has a height of, for example, 1200 mm to 2000 mm (typically, 1650 mm). The heating cooking device 100 has a width of, for example, 600 mm to 2000 mm (typically, 1200 mm). The heating cooking device 100 has a depth of, for example, 300 mm to 2000 mm (typically, 760 mm).

As shown in FIG. 4, the door 52 of the heating cooking device 100 is provided with a handle 53. The door 52 is openable or closable with the handle 53. The door 52 includes a transparent window 52a in a part thereof, and the transparent window 52a is formed of a light-transmissive member (glass plate). The heating state in the interior 51 of the heating cooking device 100 is visually checked through the light-transmissive member 52a.

In the heating cooking device 100 in this example, the superheated vapor generation device 30 includes a plurality of second electric heaters 35. Specifically, the second electric heater 35 is inserted into each of the second housing 32 of a superheated vapor generation device 30A and the second housing 32 of a superheated vapor generation device 30C. The second housing 32 of a superheated vapor generation device 30B located at the center between the superheated vapor generation device 30A and the superheated vapor generation device 30C plays a role of putting together superheated vapor generated by the superheated vapor generation device 30A and the superheated vapor generation devices 30A and 30C and transferring the resultant superheated vapor to the fan 40.

The second electric heater 35 may be inserted into the second housing 32 of the superheated vapor generation device 30B at the center. Alternatively, a plurality of second electric heaters 35 may be provided parallel to each other in the horizontal direction, such that the second electric heaters 35 are inserted in opposite directions alternately. In the case where the second electric heaters 35 are located alternately as described above, the temperature difference between tip parts and bottom parts of the second electric heaters 35 is alleviated (counteracted or averaged). Thus, the temperature of the superheated vapor to be generated is made uniform.

The superheated vapor generated by the superheated vapor generation devices (30A through 30C) is transferred to the fan 40. The superheated vapor flows in the introduction pipe 43 coupled with a pipe joint 43a of the fan 40 and is transferred to the interior 51 of the heating furnace 55. The water storage tank 10 is coupled with the hot vapor generation device 20, and the hot vapor generated by the hot vapor generation device 20 is transferred to the superheated vapor generation devices (30A through 30C).

As shown in FIG. 6, the shelves 54, on which the food 90 may be placed, and supports 54a supporting the shelves 54 are located in the interior 51 of the heating furnace 55. The supports 54a are each a metal rod member having an L-shaped cross-section, and are secured to side surfaces of the heating furnace 55. As shown in FIG. 7, the U-shaped heaters 57 each formed of an electric heating wire (nichrome wire, etc.) are located in the interior 51 of the heating furnace 55.

In the case where the heating cooking device 100 shown here is used to heat frozen fish that has not been defrosted (frozen mackerel, etc.), a temperature non-uniformity in the heating furnace 55 is suppressed and thus ideal heating is performed. The cooked fish tastes very delicious and does not taste like frozen fish. This is not limited to frozen fish. Also for meat products such as chicken meat or the like taste, ideal heating is performed. Such a meat product does not taste like general meat commonly sold in supermarkets but tastes like high quality meat. The temperature non-uniformity in the heating furnace 55 varies in accordance with the characteristics (size, capability of the fan, etc.) of the heating cooking device 100 in this embodiment, and is made ±10° C. or less. By contrast, in a heating cooking device using superheated vapor derived from high-temperature, high-pressure boiler vapor, a heating non-uniformity of ±20° C. to 30° C. or larger is caused.

Heating of a food material with superheated vapor derived from boiler vapor will be further described. The temperature at the time of introduction into the heating furnace is set as determined. However, the temperature non-uniformity in the interior of the heating furnace is large, and thus it is very difficult to properly control the temperature in the furnace. Reasons for this are, for example, that the superheated vapor derived from the boiler vapor contains air and has a high flow rate. For theses reasons, it is difficult to provide a temperature state with the superheated vapor derived from the boiler vapor, unlike the heating cooking device 100 in this embodiment. This will be described more specifically. When the superheated vapor derived from boiler vapor is sprayed to the food material 90, a part of the food material 90 is hit well by the superheated vapor but another part of the food material 90 is not hit well by the superheated vapor because of the high flow rate of the superheated vapor. The difference is significant. For this reason, delicious processed food is not provided. In addition, heating performed by use of the superheated vapor having a high flow rate is extremely difficult to be controlled. Such superheated vapor is not suitable to control on the temperature for heating the food 90 (control on the heating temperature), which needs to be performed very precisely. The boiler vapor contains impurities (e.g., strong alkaline components), and therefore, the superheated vapor derived from boiler vapor hitting the food 90 influences the taste. Since the superheated vapor derived from boiler vapor contains air, and the air acts as a heat insulator. This causes a heating non-uniformity and thus influences the taste. In the case where the superheated vapor derived from boiler vapor is used, a boiler generating the boiler vapor is needed, and also a large scale heating device heating the boiler vapor is needed. A heating cooking device including such elements has a significantly lower energy efficiency than the heating cooking device 100 in this embodiment.

So far, a preferable embodiment of the present invention has been described. The above-described description does not limit the present invention in any way. The present invention may be modified in any of various manners. For example, a pipe with a valve that allows the vapor (gas) to exit from the interior 51 of the heating furnace 55 may be provided in a top part of the heating cooking device 100. In order to forcibly cause the vapor (gas) to exit from the interior 51 of the heating furnace 55, an exit pipe may be connected with a pipe (55) for circulating ventilation and the valve may be opened for causing the gas to exit from the interior 51. In this manner, the gas in the interior 51 is forcibly caused to exit.

For cooking rice in the heating furnace 55 with the technology according to the present invention, it is preferable to use superheated vapor having a temperature of about 150° C. With the superheated vapor at such a temperature, the ratio of water added to rice is increased from 120%, which is conventionally used, to 150%. Thus, the time required to cook rice is shortened to about half, and the taste of the rice is made better. The technology according to the present invention is preferably usable for steaming or baking of marine products, and is also positively usable for producing bread, tea, or snacks using glutinous rice, cooking pastry or meat, or steaming vegetable, potato or the like. The technology according to the present invention is further usable to process fish, the bones of which are edible, by use of the properties of the superheated vapor. The superheated vapor is also usable to cook "donburi" (rice with toppings served in a bowl) such as "oyakodon" (rice with chicken and egg served in a bowl) or the like.

The liquid from which the superheated vapor is generated is not limited to water, and may be any other appropriate liquid. For example, vapor (superheated vapor) of a liquid containing seasoning may be used to cook a food material. In heating furnace 55, steam frying is realized, instead of oil frying. Specifically, high-temperature (super high-temperature) superheated vapor is used to fry a food material. The fried food contains no (or little) oil and thus is healthy. This prevents the plant environment from being deteriorated by oil frying and solves the environmental problem caused by waste oil.

Now, a heating cooking device 101 will be described with reference to FIG. 8 through FIG. 14 in a modified embodiment according to the present invention. The heating cooking device 101 is suitable as a cooking device for an open kitchen (batch-type heating device) that is installed in a restaurant or a garden.

Figure 8:
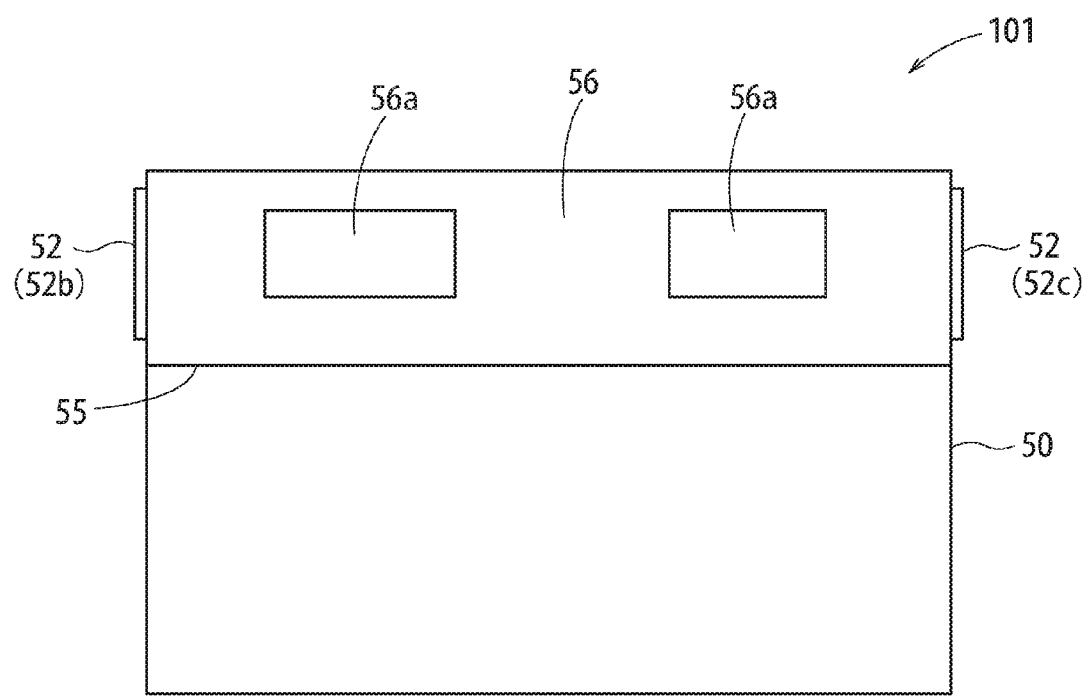
FIG. 8 is a front view showing an example of structure of a heating cooking device 101 in an embodiment according to the present invention.
Figure 9:
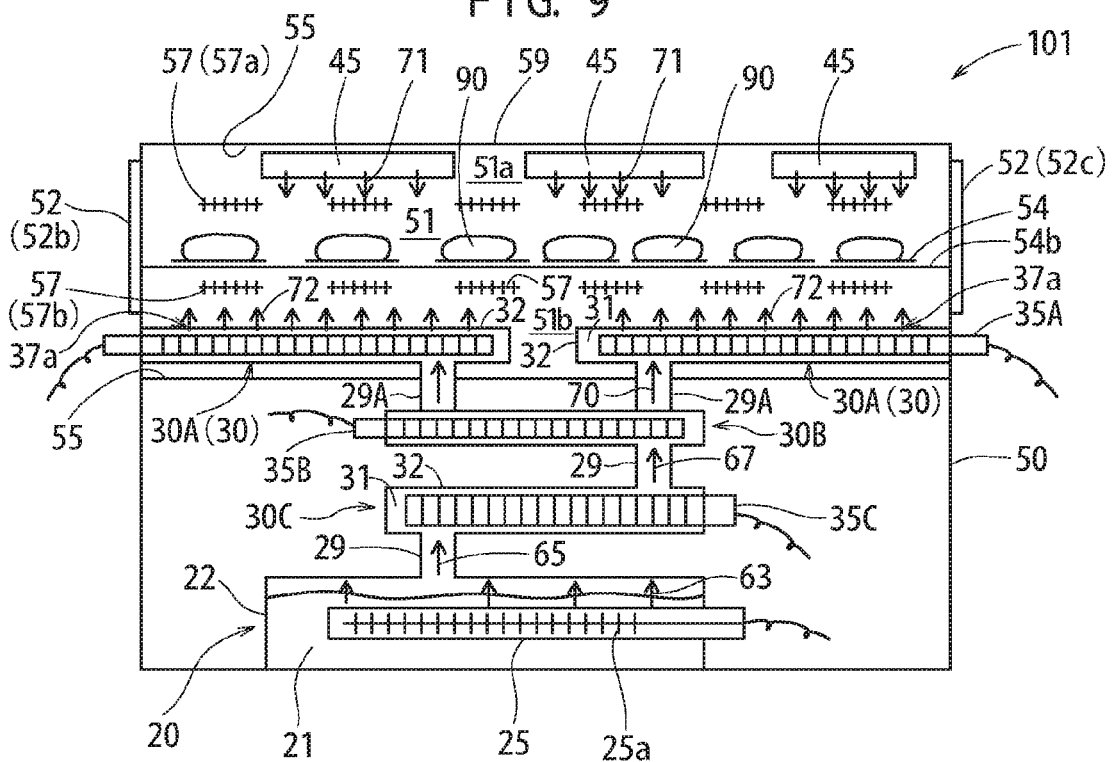
FIG. 9 shows an example of structure of the heating cooking device 101 in an embodiment according to the present invention.
Figure 10:
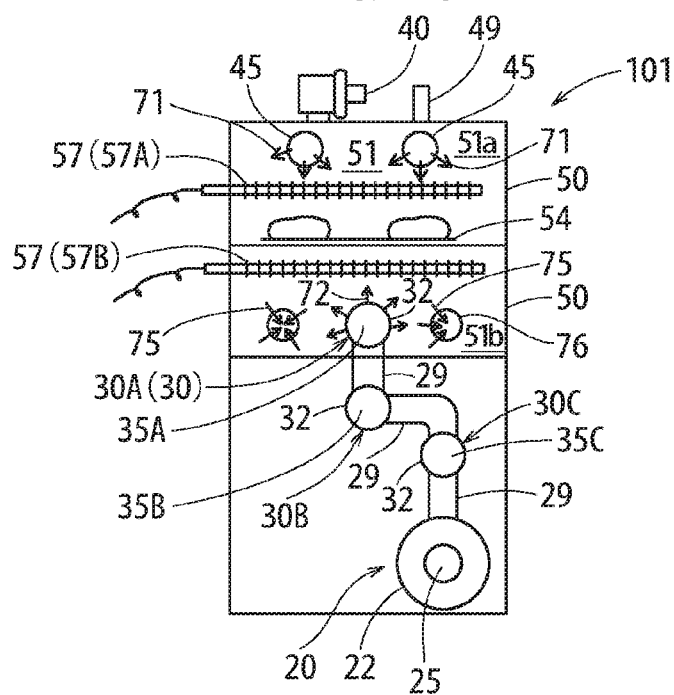
FIG. 10 shows an example of structure of the heating cooking device 101 in an embodiment according to the present invention.

FIG. 8 is a front view of a heating cooking device (heating device) 101 in this embodiment. FIG. 9 is a schematic front view (see-through cross-sectional view) of the heating cooking device (heating device) 101 in this embodiment. FIG. 10 is a schematic view (see-through cross-sectional view) of the heating cooking device (heating device) 101 in this embodiment, as seen from a side surface thereof.

Figure 11:
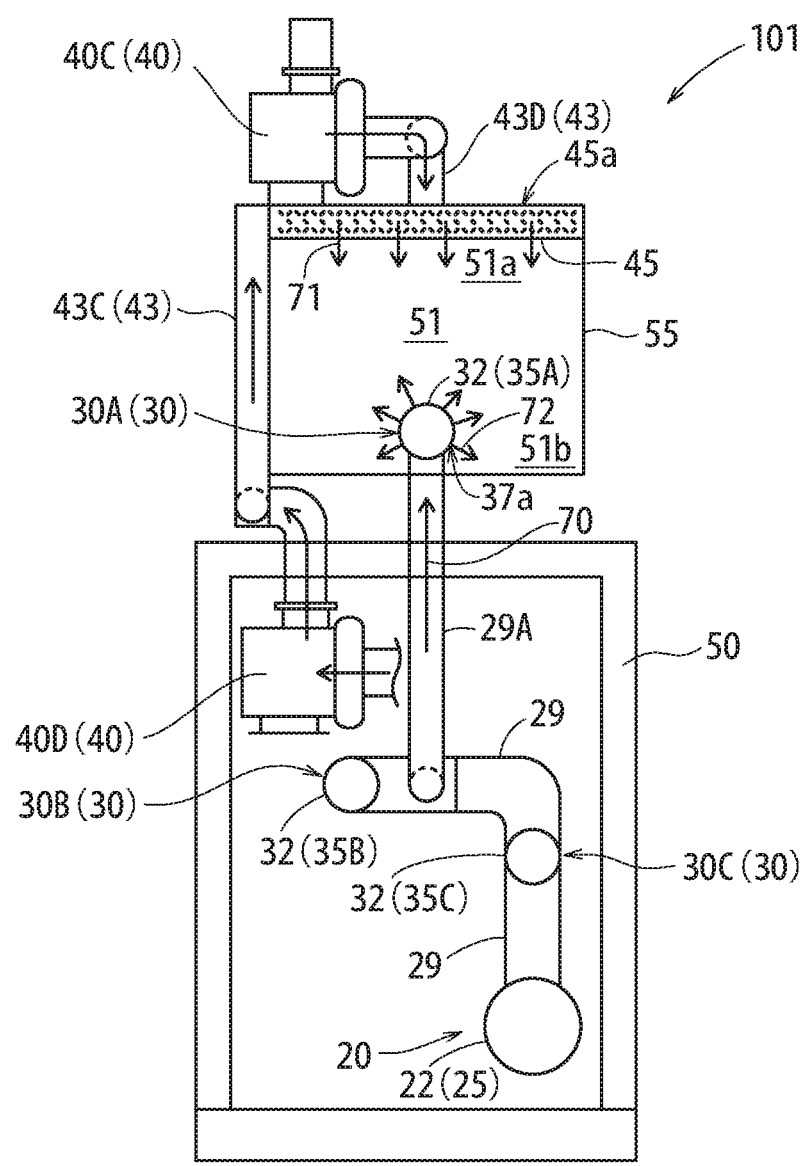
FIG. 11 shows an example of structure of the heating cooking device 101 in an embodiment according to the present invention.
Figure 12:
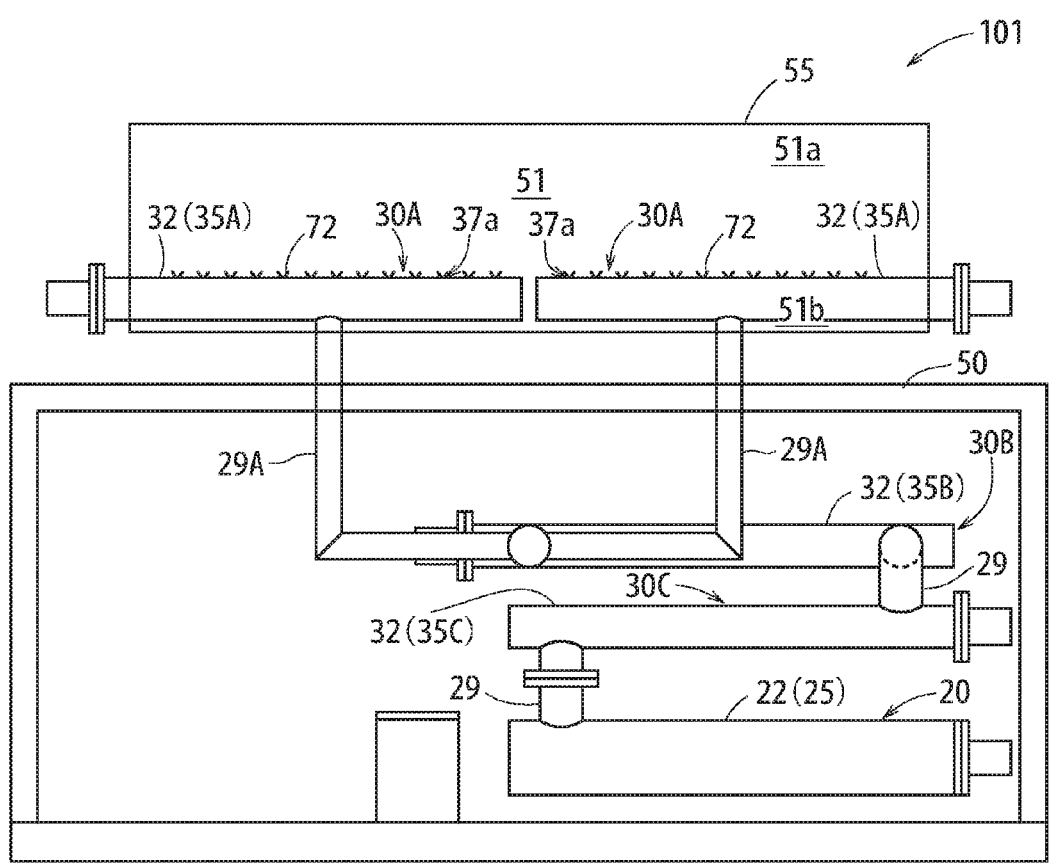
FIG. 12 shows an example of structure of the heating cooking device 101 in an embodiment according to the present invention.
Figure 13:
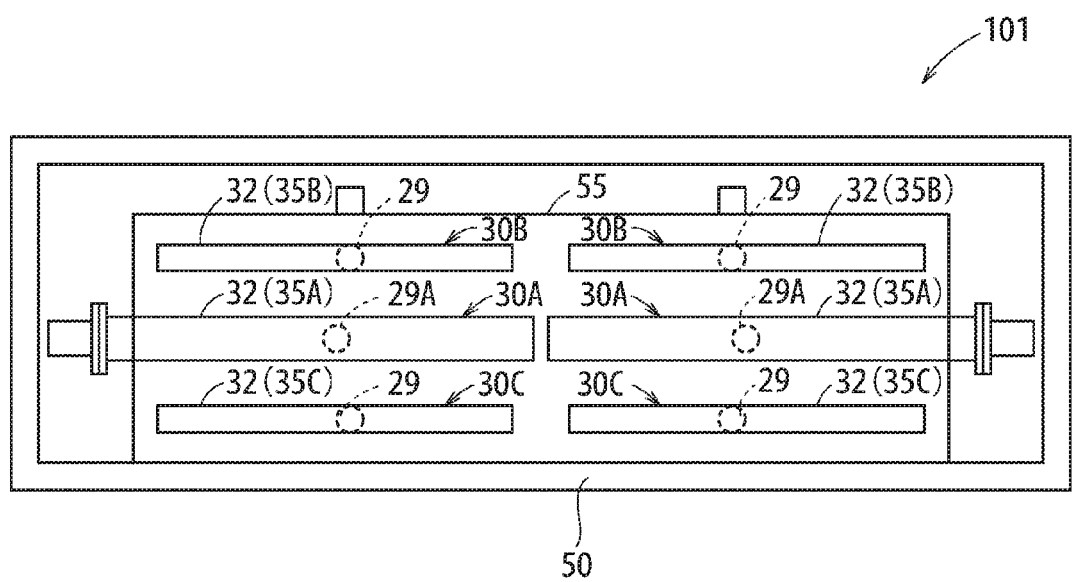
FIG. 13 shows an example of structure of the heating cooking device 101 in an embodiment according to the present invention.

FIG. 11 is a schematic view (see-through cross-sectional view) of the heating cooking device (heating device) 101 in this embodiment, as seen from a side surface thereof. FIG. 12 is a schematic view (see-through cross-sectional view) of the heating cooking device (heating device) 101 in this embodiment, as seen from the front thereof. FIG. 13 is a cross-sectional view of the heating cooking device (heating device) 101 in this embodiment taken along a horizontal line.

The heating cooking device 101 in this embodiment is installed in, for example, a steak restaurant (or a barbecue restaurant, a barbecue garden, etc.) and is used to cook a food material 90 such as meat, a marine product or the like. In the structure of this embodiment, the heating furnace 55 is located in a top part in the casing 50. In the example shown in FIG. 8, parts of a front cover 56 of the heating furnace 55 are formed of light-transmissive members (e.g., glass plates) 56a, through which the inside of the heating furnace 55 is visually checked. With such a structure, it is checked that the food material (heating target) 90 located in the interior 51 of the heating furnace 55 is being cooked (baked). This is useful for a person in the vicinity of the heating cooking device 101 (e.g., person cooking/serving, or a person waiting for the meal), and also is usable as a display for the restaurant or the garden.

In this example, the doors 52 (52b, 52c) are provided on side surfaces (on the left side and the right side as seen from the front) of the heating furnace 55. Since the doors 52 are provided on the side surfaces (left side surface and right side surface) of the heating furnace 55, the food material 90 may be put into, or taken out from, the heating furnace 55 while the food material 90 in the heating furnace 55 is displayed through the transparent windows (the light-transmissive members) 56a. As described above, in the structure of this embodiment, the inside of the heating furnace 55 has a pressure of substantially 1 atm. This is convenient because even during heating (cooking), the doors 52 may be opened to put the food material 90 into, or take out the food material 90 from, the heating furnace 55. In addition, the state where the food material 90 is cooked (baked) is kept displayed while another food material 90 is replaced with a new food material.

As shown in FIG. 9, in the heating cooking device 101 in this embodiment, a shelf (e.g., gridiron) 54 is provided in the interior 51 of the heating furnace 55. In this example, the shelf 54 has a one-stage structure (namely, one shelf extends in the horizontal direction). On the shelf 54, the food material 90 (in this example, meat such as beef, pork, chicken or the like, or marine product such as fish, squid, shrimp or the like) is located. Below the shelf (e.g., gridiron) 54, a moving rail (e.g., gridiron moving rail) 54b for moving the shelf 54 (e.g., gridiron having the food material 90 put thereon) is located. In the case where the food material 90 is meat (especially, beef or pork) and the meat is thick, it is preferable that the shelf 54 has a one-stage structure and the meat is cooked with superheated vapor directed from above and below the shelf 54 (see arrows 71 and 72). In the case where the food material 90 is thin, shelves 54 of a multi-stage structure may be provided as shown in FIG. 1 and FIG. 6. In the case where the food material 90 is baked with the superheated vapor directed from above and below the shelf 54, it is convenient to use, as the shelf 54, a gridiron suitable to be heated from below. Alternatively, the shelf 54 may be an iron plate or the like. Occasionally, oil (fat) or water drips may be exuded out of the meat or fish. In order to prevent the oil or water drips from dropping in the heating furnace 55, a metal film (e.g., aluminum film), a metal plate (e.g., iron plate) or any other appropriate member (film, dish, etc.) may be put on the shelf 54 (or a metal film, a metal plate or the like may be used as the shelf 54) before cooking of the food material (meat, fish, etc.) is started. Alternatively, a metal plate (metal dish) for receiving the drips may be located below the shelf 54 (especially, above the bottom electric heating wire 57b).

In the structure of the heating cooking device 101 in this embodiment, the superheated vapor (71 and 72) are introduced into the interior 51 of the heating furnace 55 from above and below. In the structure of this embodiment, the superheated vapor generation devices 30 (30A) are located in the interior 51 of the heating furnace 55. The second housing 32 accommodating an electric heater 35A of each of the superheated vapor generation devices 30 (30A) has a through-hole (vent hole, opening) 37a formed therein. The superheated vapor 72 is introduced from an interior 31 of the second housing 32 into the interior 51 of the heating furnace 55 via the through-hole 37a.

In this example, the superheated vapor generation devices 30 (30A) are provided in the bottom region 51b of the interior 51 of the heating furnace 55. The bottom region 51b of the interior 51 of the heating furnace 55 tends to have a lower temperature than the top region 51*a* during heating (cooking). However, the heat of the superheated vapor 72 released from the superheated vapor generation devices 30 (30A) (and the heat of the electric heater 35A of each of the superheated vapor generation devices 30 (30A)) decreases the temperature difference between the bottom region 51*b* and the top region 51*a* of the interior 51 of the heating furnace 55. In the structure in which the superheated vapor discharge portion 45 is located in the top region 51*a* of the interior 51 of the heating furnace 55, a top surface (top region) of the food material 90 is baked (heated) better than a bottom surface of the food material 90. In the structure in which the superheated vapor generation devices 30 (30A) are located in the bottom region 51*b* of the interior 51 of the heating furnace 55 in addition to the superheated vapor discharge portion 45, the bottom surface (bottom region) of the food material 90 is also baked (cooked) well because the heat of the superheated vapor 72 from the superheated vapor generation devices 30 (30A) is also used.

In the structure shown in FIG. 9, the electric heating wires 57 (57*a*, 57*b*) providing a grilling mark on the surface of the food material 90 are located above and below the shelf 54, on which the food material 90 may be located. In this embodiment, the electric heating wires 57 (57*a*, 57*b*) are secured and are not movable in the up-down direction (gravitational direction), but the shelf 54 (and/or the moving rails 54*b* operable in association with the shelf 54) are movable in the up-down direction. Therefore, an appropriate grilling mark or brown color may be provided to the food material 90 by the electric heating wires 57 each located at a position that is set to have an appropriate distance from the food 90. Alternatively, the electric heating wires 57 (57*a*, 57*b*) in this embodiment may be movable in the up-down direction (gravitational direction).

In the structure of this embodiment, the hot vapor generation device 20 generating the hot vapor 63 is located in a bottom region in the casing 50. Although not shown in FIG. 9, the hot vapor generation device 20 is connected with the water storage tank 10 storing a liquid (water). Specifically, like in FIG. 1, the hot vapor generation device 20 is coupled with the water storage tank 10 via the communication pipe 15. The water level WL2 in the hot vapor generation device 20 and the water level WL1 in the water storage tank 10 match each other by the Pascal's principle. With such an arrangement, the water level WL2 in the water storage tank 10 is controlled in a simple manner and stably. As a result, the hot vapor 63 is generated stably. Thus, the amount of the superheated vapor (71, 72) to be generated may be controlled at high precision. In the case where the hot vapor 63 is generated relatively stably by the hot vapor generation device 20 or in the case where the amount of the hot vapor (superheated vapor) to be generated does not need to be controlled precisely, the water storage tank 10 or the communication pipe 15 may not be provided. Basically, however, it is preferable that water storage tank 10 and the communication pipe 15 are provided to control such that a stable amount of the hot vapor (superheated vapor) is generated. In this example, the hot vapor generation device 20 includes the first electric heater 25 heating the liquid (water) 21 and the first housing 22 accommodating the first electric heater 25 and holding the liquid 21 therein. The first electric heater 25 includes fins 25*a* (annular members formed of a metal material) provided for the purpose of improving the heating efficiency.

In this embodiment, additional superheated vapor generation devices 30 (30B, 30C) are provided between the hot vapor generation device 20 and the superheated vapor generation devices 30 (30A) located in the interior 51 of the heating furnace 55. With such an arrangement, the temperature of the hot vapor 63 generated by the hot vapor generation device 20 is raised in a plurality of steps. Thus, the temperature of the interior 51 of the heating furnace 55 may be raised to, for example, 400° C. In the example shown in FIG. 9, two superheated vapor generation devices 30B and 30C are provided as the additional superheated vapor generation devices 30. Alternatively, one superheated vapor generation device may be provided, or three or more superheated vapor generation devices may be provided. In the example shown in FIG. 9, the superheated vapor heated by the additional superheated vapor generation devices 30 (30B, 30C) is introduced into the superheated vapor generation devices 30 (30A) in the heating furnace 55. Alternatively, the superheated vapor heated by the additional superheated vapor generation devices 30 (30B, 30C) may be introduced into the heating furnace 55. Still alternatively, as shown in FIG. 1, only the superheated vapor generation device 30 (30A) may be provided, namely, the additional superheated vapor generation devices 30 (30B, 30C) may not be provided.

As shown in FIG. 10, in the bottom region 51*b* of the interior 51 of the heating furnace 55, an absorption opening 76 is provided for absorbing gas 75 present in the bottom region 51*b* (superheated vapor, vapor generated as a result of the superheated vapor being cooled, or gas generated from the food). The superheated vapor generated by the superheated vapor generation devices 30 (30A, 30B, 30C) is introduced into the superheated vapor discharge portion 45 located in the top region 51*a* of the interior 51 of the heating furnace 55 via a pipe (not shown in FIG. 9 or FIG. 10), and is released from the superheated vapor discharge portion 45 into the interior 51 of the heating furnace 55 (arrows 71). Absorption through the absorption opening 76 and/or the introduction into the superheated vapor discharge portion 45 is performed by use of the fan 40. Specifically, the superheated vapor 72 released from the superheated vapor generation devices 30 (30A) into the interior 51 of the heating furnace 55 (i.e., superheated vapor of a relatively high temperature) is absorbed into the absorption opening 76 by an absorbing force of the fan 40, and then the superheated vapor 71 is released from the superheated vapor discharge portion 45 located in the top region 51*a* by a ventilation force of the fan 40.

In the interior 51 of the heating furnace 55, the top region 51*a* has a higher temperature than the bottom region 51*b*. Therefore, the superheated vapor 72 (superheated vapor of a relatively high temperature) is released into the bottom region 51*b*, and passes the fan 40 via the absorption opening 76. Then, the superheated vapor 71 (superheated vapor of a lower temperature than the absorption opening 76) is released from the top region 51*a*. Such an arrangement contributes to keeping the temperature of the interior 51 of the heating furnace 55 uniform.

In the example shown in FIG. 10, a pipe (smoke discharge pipe) 49 for discharging smoke from the interior 51 of the heating furnace 55 is attached to the heating furnace 55. The smoke discharge pipe 49 attached in this manner solves the problem of smoke generated by baking the food 90 in the heating furnace 55. An exhaust pump may be connected with the smoke discharge pipe 49. An exhaust valve (air discharge valve) for discharging air may be attached to the heating furnace 55.

In the example shown in FIG. 9, the hot vapor (minute pressure vapor) 63 generated by the hot vapor generation device 20 flows in the pipe 29 (arrow 65) and reaches the superheated vapor generation device 30C. As described above, the hot vapor 63 is of a minute pressure, and therefore, moves in the pipe 29 slowly. The hot vapor 63 moves slowly also in the superheated vapor generation device 30C (interior 31 of the second housing 32) and is heated by an electric heater 35C to become superheated vapor. Then, the superheated vapor flows from the superheated vapor generation device 30C to the superheated vapor generation device 30B via the pipe 29 as represented by arrow 67, and is heated also in the superheated vapor generation device 30B. The superheated vapor flows from the superheated vapor generation device 30B into the heating furnace 55 via pipes 29A (arrows 70), and is heated in the superheated vapor generation devices 30A. Then, the superheated vapor is released from the superheated vapor generation devices 30A into the heating furnace 55. As shown in FIG. 10, a part of the released superheated vapor is absorbed into the absorption opening 76, passes the fan 40 and is released from the superheated vapor discharge portion 45 into the heating furnace 55 (arrows 71).

FIG. 11 is a schematic side view showing an example of the heating cooking device 101 in this embodiment. In the example shown in FIG. 11, a plurality of fans 40, namely, an absorption fan 40D (first fan) and a ventilation fan 40C (second fan), which are coupled with each other via a pipe 43C (43), are provided. The absorption fan 40D absorbs superheated vapor from the absorption opening 76 shown in FIG. 10. The superheated vapor is transferred from the absorption fan 40D to the ventilation fan 40C via the pipe 43C. Then, the superheated vapor flows in a pipe 43D (43), is discharged from the releasing openings 45a of the superheated vapor discharge portion 45 and is introduced into the top region 51a of the heating furnace 55. The superheated vapor introduced into the interior 51 of the heating furnace 55 is used to bake the food material 90. The superheated vapor (or vapor) having the temperature thereof decreased as a result of contacting the food material 90 is moved to the bottom region 51b of the heating furnace 55. Then, the superheated vapor (gas having a low temperature) is absorbed into the absorption opening 76 together with superheated vapor of a higher temperature newly introduced into the bottom region 51b, and has the temperature thereof raised as a result of being mixed with the gas of the higher temperature (superheated vapor). In this state, the superheated vapor is introduced into the top region 51a of the heating furnace 55.

Figure 14:
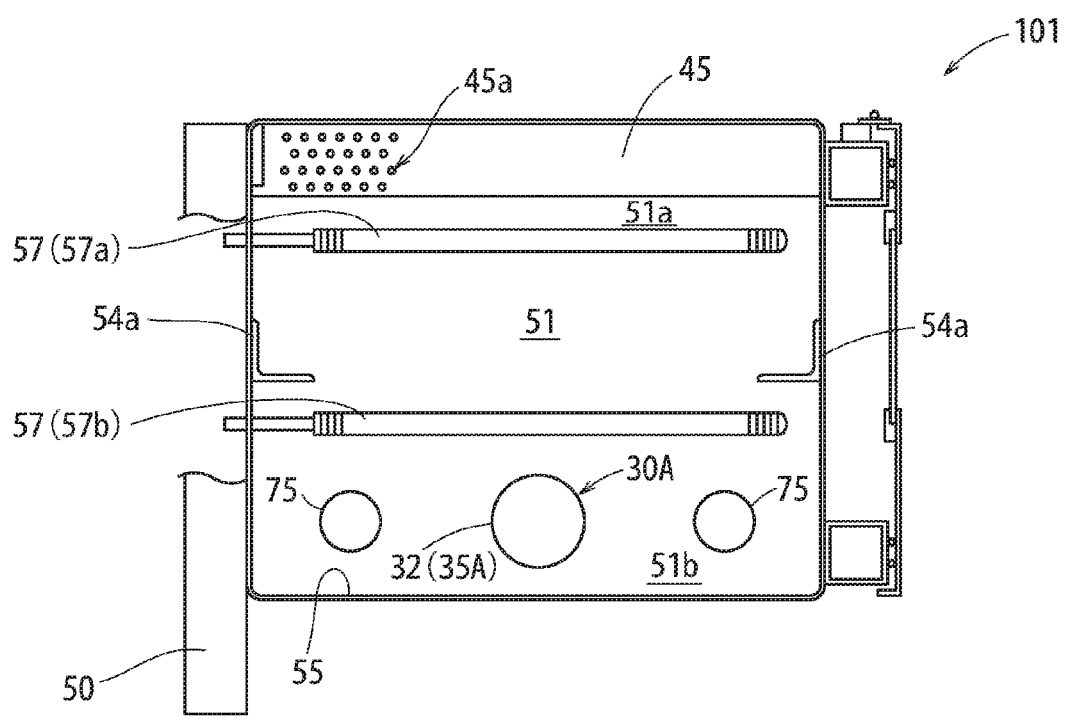
FIG. 14 shows an example of structure of the heating cooking device 101 in an embodiment according to the present invention.

FIG. 12 is a vertical cross-sectional view showing pipes of an example of the heating cooking device 101 in this embodiment. FIG. 12 substantially corresponds to FIG. 11. FIG. 13 is a horizontal cross-sectional view showing the pipes of an example of the heating cooking device 101 in this embodiment. FIG. 14 is a vertical cross-sectional view showing an example of structure of the heating furnace 55. The structures shown in FIG. 12, FIG. 13 and FIG. 14 are the same as described above, and will not be described. The structures shown in FIG. 11, FIG. 12, FIG. 13 and FIG. 14 are each an example of the heating cooking device 101 in this embodiment. The heating cooking device 101 is not limited to any of these examples, and may have any other appropriate structure. For example, in the structure shown in FIG. 13, there are two (one pair, i.e., left and right) superheated vapor generation devices 30A. Alternatively, more than two (e.g., four (two pairs) or more) superheated vapor generation devices 30A may be provided. Still alternatively, one superheated vapor generation device 30A may be provided, not the two (one pair, i.e., left and right) superheated vapor generation devices 30A.

The heating cooking device 101 in this embodiment has a height of, for example, 900 mm to 1800 mm (typically, 1200 mm). The heating furnace 55 has a height of, for example, 300 mm, and the base part supporting the heating furnace 55 has a height of, for example, 800 mm. The heating cooking device 101 has a width of, for example, 600 mm to 3000 mm (typically, 2000 mm). The heating cooking device 101 has a depth of, for example, 300 mm to 1000 mm (typically, 600 mm).

In the case where meat (beef) is baked by use of the heating cooking device 101 in this embodiment, 12 to 15 pieces of steak meat each having a weight of 450 g may be baked within 5 to 8 minutes. Eight pieces of rib steak meat each having a weight of 1 kg may be baked within 5 to 8 minutes. Such a baking capability is high for a heating cooking device for an open kitchen. Since superheated vapor is used, the baked meat is more delicious than by meat baked with gas or the like.

The structure of the heating cooking device 101 described above may be modified in any of various manners. For example, in the example shown in FIG. 9, the shelf 54 may have a multi-stage structure instead of a one-stage structure. In the structure shown in FIG. 9, the superheated vapor generation devices 30A may not have the through-hole formed therein, so that the superheated vapor is be moved toward the superheated vapor discharge portion 45 by use of the fan 40 as shown in FIG. 1. In the structure shown in FIG. 1, the second housing 32 of the superheated vapor generation devices 30 may have a through-hole formed therein, so that the superheated vapor 66 is released into the heating furnace 55 via the through-hole. In the structure shown in FIG. 1, a plurality of the superheated vapor generation devices 30 may be provided (arranged in series or parallel), so that the temperature of the superheated vapor is raised in a plurality of steps. The size of each of the heaters (35, 57), the size of the heating furnace 55, the set temperature for the heating furnace 55, and the like may be set to a preferable value in accordance with the conditions of use.

Figure 15:
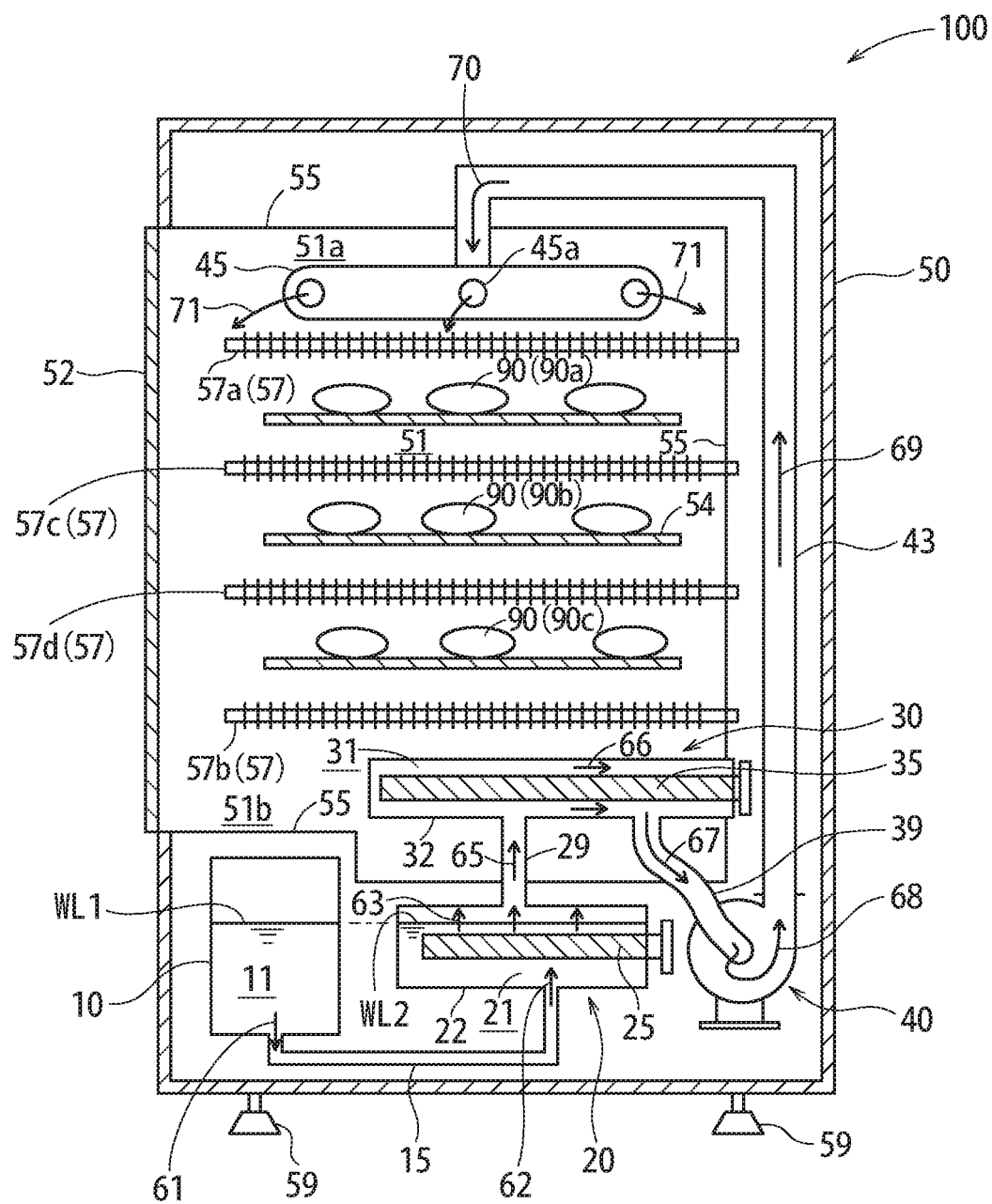
FIG. 15 shows an example of modification of the heating cooking device 100 in an embodiment according to the present invention.

As shown in FIG. 15, in the structure of the heating cooking device 100 (see FIG. 1), electric heating wires (57c, 57d) may be located between the shelves 54 in addition to the top and bottom electric heating wires (57a, 57b), so that the electric heating wires are provided in a middle region in addition to the top and bottom regions. The electric heating wires may or may not be located at an equal interval. In the case where the food material 90 is easy to burn (fish or meat), the electric heating wires 57 are located far from the food material 90. In the case where it is wished to provide a grilling mark on the food material 90 (meat or fish), the electric heating wires 57 are located close to the food material 90. This is also applicable to the heating cooking device 101 shown in FIG. 9 including the shelves 54 (and the food materials 90 placed thereon) having a multi-stage structure. In the heating cooking device 100 (101) shown in FIG. 1 or FIG. 9, the electric heating wires 57 and the second electric heater 35 of the superheated vapor generation device 30 are ON/OFF switchable. These heat generating devices are controlled (independently or in association with each other), and thus the temperature of the interior 51 of the heating furnace 55 (inner temperature) is controlled. Such temperature control is performed based on data from the temperature sensor located in the interior 51 (based on temperature data). The heating cooking device in this embodiment may include a control device controlling such heating. The control device controls the electric heating wires 57 and/or the electric heaters 35(25) based on the numerical value of the temperature sensor and the heating program to operate the heating cooking device 100 (101).

The present invention provides a heating cooking device and a heating cooking method realizing a high temperature uniformity.

DESCRIPTION OF THE REFERENCE SIGNS

10 Water storage tank
15 Communication pipe
20 Hot vapor generation device
22 First housing
25 First electric heater
29 Pipe
30 Superheated vapor generation device
32 Second housing
35 Second electric heater
37a Through-hole
39 Pipe
40 Fan
40B Circulation fan
40C Ventilation fan
40D Absorption fan
43 Introduction pipe
43B Introduction pipe
45 Superheated vapor discharge portion
45a Releasing opening
50 Casing
51 Interior of the heating furnace
51a Top region
51b Bottom region
52 Door
52a Transparent window (Light-transmissive member)
53 Handle
54 Shelf
54a Support
55 Heating furnace
57 U-shaped heater
76 Absorption opening
90 Heating target (food, food material)
100 Heating cooking device
101 Heating cooking device

What is claimed is:

1. A heating cooking device configured to perform heating by use of superheated vapor, comprising:
a casing accommodating a heating furnace allowing a heating target to be located therein;
a water storage tank accommodated in the casing, the water storage tank configured to store a liquid;
a hot vapor generation device connected with the water storage tank via a communication pipe, the hot vapor generation device configured to heat the liquid supplied from the water storage tank to generate hot vapor;
a superheated vapor generation device connected with the hot vapor generation device, the superheated vapor generation device configured to heat the hot vapor generated by the hot vapor generation device to generate superheated vapor;
the superheated vapor generation device is located in a bottom region of an interior of the heating furnace;
a fan configured to pull the superheated vapor and introduce the superheated vapor generated by the superheated vapor generation device into the heating furnace;
an introduction pipe having an end connected with the fan and another end connected with a top part of the heating furnace; and
a superheated vapor discharge portion connected with the introduction pipe, the superheated vapor discharge portion configured to discharge the superheated vapor into an interior of the heating furnace;
wherein
the hot vapor generation device includes,
a first electric heater configured to heat the liquid; and
a first housing accommodating the first electric heater and configured to hold the liquid;
the first housing and the water storage tank are connected with each other via the communication pipe to match a water level of the liquid in the first housing and a water level of the liquid in the water storage tank with each other;
the superheated vapor generation device includes,
at least one second electric heater configured to heat the hot vapor; and
at least one second housing accommodating the at least one second electric heater;
at least a part of the at least one second electric heater and at least a part of the at least one second housing are located in the interior of the heating furnace; and
the hot vapor generation device and the superheated vapor generation device are accommodated in the casing.

2. The heating cooking device according to claim 1, further comprising:
a circulation fan configured to absorb the superheated vapor located in a bottom region of the interior of the heating furnace and discharge the superheated vapor into a top region of the interior of the heating furnace.

3. The heating cooking device according to claim 1, wherein
the superheated vapor generation device is located in a bottom region of the interior of the heating furnace; and
the superheated vapor discharge portion is located in a top region of the interior of the heating furnace.

4. The heating cooking device according to claim 3, wherein the superheated vapor generation device includes a plurality of second electric heaters and a plurality of second housings.

5. The heating cooking device according to claim 1, further comprising:
a U-shaped heater formed of an electric heating wire, the U-shaped heater being located in the interior of the heating furnace.

6. The heating cooking device according to claim 1, wherein a U-shaped heater is provided in each of a top region and a bottom region of the interior of the heating furnace.

7. The heating cooking device according to claim 1, further comprising:
a control device connected with the first electric heater and the at least one second electric heater, the control device configured to control heating performed by the first electric heater and the at least one second electric heater; and
a temperature sensor provided in the interior of the heating furnace,
wherein the temperature sensor is connected with the control device.

8. The heating cooking device according to claim 1, wherein the hot vapor generated by the hot vapor generation device is saturated water vapor having a minute pressure having a gauge pressure of 0.1 MPa or less.

9. A heating cooking device configured to perform heating by use of superheated vapor, comprising:
- a casing accommodating a heating furnace allowing a heating target to be located therein;
- a hot vapor generation device configured to generate hot vapor;
- a superheated vapor generation device connected with the hot vapor generation device, the superheated vapor generation device configured to heat the hot vapor generated by the hot vapor generation device to generate superheated vapor;
  - the superheated vapor generation device is located in a bottom region of an interior of the heating furnace;
- a fan configured to pull the superheated vapor and introduce the superheated vapor generated by the superheated vapor generation device into the heating furnace;
- an introduction pipe having an end connected with the fan and another end connected with a top part of the heating furnace; and
- a superheated vapor discharge portion connected with the introduction pipe, the superheated vapor discharge portion configured to discharge the superheated vapor into an interior of the heating furnace;
- wherein
- the hot vapor generation device includes,
  - a first electric heater configured to heat a liquid; and
  - a first housing accommodating the first electric heater and configured to hold the liquid;
- the superheated vapor generation device includes,
  - a second electric heater configured to heat the hot vapor; and
  - a second housing accommodating the second electric heater;
- at least a part of the second electric heater and at least a part of the second housing are located in the interior of the heating furnace; and
- the second housing has a through-hole, through which the superheated vapor is released, the through-hole being formed in a part of the second housing located in the interior of the heating furnace.

10. The heating cooking device according to claim 9, further comprising:
- an absorption opening through which gas in the interior of the heating furnace is absorbed, the absorption opening being located in a bottom region of the interior of the heating furnace,
- wherein the fan is a circulation fan configured to transfer the gas, absorbed through the absorption opening, to the superheated vapor discharge portion to circulate the gas in the interior of the heating furnace.

11. The heating cooking device according to claim 9, further comprising:
- a water storage tank storing the liquid, wherein
  - the first housing and the water storage tank are connected with each other via a communication pipe to match a water level of the liquid in the first housing and a water level of the liquid in the water storage tank with each other;
  - the superheated vapor discharge portion is located in a top region of an interior of the heating furnace; and
  - the heating cooking device further comprises a shelf allowing the heating target to be located thereon, the shelf being located between the superheated vapor generation device and the superheated vapor discharge portion.

12. The heating cooking device according to claim 11, further comprising:
- an electric heating wire putting a grilling mark on a surface of the heating target, the electric heating wire being located above and below the shelf; and
- at least one additional superheated vapor generation device provided between the hot vapor generation device and the superheated vapor generation device.

13. The heating cooking device according to claim 9, further comprising:
- a door for putting the heating target on a shelf or taking out the heating target from the shelf, the door being provided on a side surface of the casing, wherein
- the casing includes a transparent window in a part thereof, the transparent window providing a display of the heating target located on the shelf; and
- the heating target is at least one selected from the group consisting of meat, a marine product and vegetable.

* * * * *